US012255005B2

(12) United States Patent
Furukawa et al.

(10) Patent No.: US 12,255,005 B2
(45) Date of Patent: Mar. 18, 2025

(54) INDUCTOR

(71) Applicant: NITTO DENKO CORPORATION, Osaka (JP)

(72) Inventors: Yoshihiro Furukawa, Osaka (JP); Keisuke Okumura, Osaka (JP)

(73) Assignee: NITTO DENKO CORPORATION, Osaka (JP)

(*) Notice: Subject to any disclaimer, the term of this patent is extended or adjusted under 35 U.S.C. 154(b) by 535 days.

(21) Appl. No.: 17/633,453

(22) PCT Filed: Jun. 19, 2020

(86) PCT No.: PCT/JP2020/024102
§ 371 (c)(1),
(2) Date: Feb. 7, 2022

(87) PCT Pub. No.: WO2021/029141
PCT Pub. Date: Feb. 18, 2021

(65) Prior Publication Data

US 2022/0285072 A1 Sep. 8, 2022

(30) Foreign Application Priority Data

Aug. 9, 2019 (JP) ................................. 2019-147271

(51) Int. Cl.
*H01F 27/28* (2006.01)
*H01F 27/255* (2006.01)

(52) U.S. Cl.
CPC ....... *H01F 27/255* (2013.01); *H01F 27/2823* (2013.01)

(58) Field of Classification Search
CPC ...... H01F 27/255; H01F 27/2823; H01F 1/26; H01F 1/37; H01F 2003/106; H01F 3/10;
(Continued)

(56) References Cited

U.S. PATENT DOCUMENTS 4,959,631 A 9/1990 Hasegawa et al.
6,392,525 B1 5/2002 Kato et al.
(Continued)

FOREIGN PATENT DOCUMENTS

EP 2 963 094 A1 1/2016
JP 40-029391 U 10/1965
(Continued)

OTHER PUBLICATIONS

Office Action, which was issued by the Japanese Patent Office on Jul. 25, 2023, in connection with Japanese Patent Application No. 2019-147271.
(Continued)

*Primary Examiner* — Tuyen T Nguyen
(74) *Attorney, Agent, or Firm* — Edwards Neils LLC; Jean C. Edwards, Esq.

(57) ABSTRACT

An inductor includes a first wire and a second wire, a first magnetic layer containing magnetic particles having an approximately spherical shape, a second magnetic layer containing magnetic particles having an approximately flat shape, and a third magnetic layer containing magnetic particles having an approximately flat shape. The relative permeability of each of the second magnetic layer and the third magnetic layer is higher than the relative permeability of the first magnetic layer. A fourth surface of the first magnetic layer has a second concave portion. A sixth surface of the third magnetic layer has a fourth concave portion.

6 Claims, 9 Drawing Sheets

(58) Field of Classification Search
CPC .... H01F 2017/048; H01F 17/04; H01F 38/20; H01F 27/32; H01F 27/28
See application file for complete search history.

(56) References Cited

U.S. PATENT DOCUMENTS

| | | | | |
|---|---|---|---|---|
| 11,948,720 | B2 * | 4/2024 | Furukawa | H01F 17/04 |
| 2005/0012583 | A1 | 1/2005 | Sutardja | |
| 2007/0252669 | A1 | 11/2007 | Hansen et al. | |
| 2009/0002117 | A1 * | 1/2009 | Kawarai | H01F 17/0006 336/233 |
| 2013/0168149 | A1 | 7/2013 | Gundel | |
| 2014/0167897 | A1 * | 6/2014 | Choi | H01F 41/046 336/83 |
| 2016/0099098 | A1 * | 4/2016 | Yamaguchi | H01F 17/04 336/221 |
| 2016/0343498 | A1 | 11/2016 | Lee et al. | |
| 2017/0004915 | A1 | 1/2017 | Park et al. | |
| 2017/0053732 | A1 | 2/2017 | Moon | |
| 2018/0218817 | A1 | 8/2018 | Kobayashi et al. | |
| 2019/0051449 | A1 | 2/2019 | Cappabianca et al. | |
| 2020/0357548 | A1 | 11/2020 | Kobayashi et al. | |
| 2022/0165483 | A1 | 5/2022 | Okumura et al. | |
| 2022/0285072 | A1 | 9/2022 | Furukawa et al. | |

FOREIGN PATENT DOCUMENTS

| | | | |
|---|---|---|---|
| JP | 60-010228 | U | 1/1985 |
| JP | 61-7013 | U | 1/1986 |
| JP | H01-146424 | U | 10/1989 |
| JP | H01-318212 | A | 12/1989 |
| JP | 5-182833 | A | 7/1993 |
| JP | 06-181123 | A | 6/1994 |
| JP | 09-306715 | A | 11/1997 |
| JP | H10-144526 | A | 5/1998 |
| JP | 11-186045 | A | 7/1999 |
| JP | 2001-185421 | A | 7/2001 |
| JP | 2004-296746 | A | 10/2004 |
| JP | 2008-288370 | A | 11/2008 |
| JP | 2009-117676 | A | 5/2009 |
| JP | 2009-129937 | A | 6/2009 |
| JP | 2012-526383 | A | 10/2012 |
| JP | 2013-093436 | A | 5/2013 |
| JP | 2013-543635 | A | 12/2013 |
| JP | 2014-165363 | A | 9/2014 |
| JP | 2017-005115 | A | 1/2017 |
| JP | 2017-017314 | A | 1/2017 |
| JP | 2018-125527 | A | 8/2018 |
| JP | 2018-137235 | A | 8/2018 |
| JP | 2020-150066 | A | 9/2020 |
| JP | 7485505 | B2 | 5/2024 |
| TW | 201702074 | A | 1/2017 |
| WO | 2010/129228 | A1 | 11/2010 |
| WO | 2012/039736 | A | 3/2012 |
| WO | 2016/199638 | A1 | 12/2016 |
| WO | 2018/057227 | A1 | 3/2018 |

OTHER PUBLICATIONS

Office Action, issued by the Korean Intellectual Property Office on Sep. 6, 2024, in connection with Korean Patent Application No. 10-2022-7003575.

International Preliminary Report on Patentability issued by WIPO on Feb. 8, 2022, in connection with International Patent Application No. PCT/JP2020/024102.

Extended European Search Report issued by the European Patent Office on Jul. 17, 2023, in connection with European Patent Application No. 20852096.5.

Office Action, which was issued by the Japanese Patent Office on Dec. 12, 2023, in connection with Japanese Patent Application No. 2019-147271.

International Search Report Issued in PCT/JP2020/024102 on Aug. 18, 2020.

Written Opinion Issued in PCT/JP2020/024102 on Aug. 18, 2020.

Office Action, issued by the Taiwanese Patent Office on May 28, 2024, in connection with Taiwanese Patent Application No. 109121805.

Office Action issued by the Japanese Patent Office on Jan. 7, 2025, in connection with Japanese Patent Application No. 2024-037592.

* cited by examiner

INDUCTOR

CROSS-REFERENCE TO RELATED APPLICATIONS

The present application is a 35 U.S.C. 371 National Stage Entry PCT/JP2020/024102, filed on Jun. 19, 2020, which claims priority from Japanese Patent Application No. 2019-147271, filed on Aug. 9, 2019, the contents of all of which are herein incorporated by reference in their entirety.

TECHNICAL FIELD

The present invention relates to an inductor.

BACKGROUND ART

Inductors including a plurality of conductors and a magnetic body layer covering the conductors have been known for example, see Patent document 1 below).

Such inductors are produced by laminating a raw sheet of ferrite on which a plurality of conductors is disposed with another sheet of ferrite and calcining the laminate.

CITATION LIST

Patent Document

Patent Document 1: Japanese Unexamined Patent Publication No. H10-144526

SUMMARY OF THE INVENTION

Problem to be Solved by the Invention

Such inductors are required to have a high inductance, excellent superimposed DC current characteristics, and an excellent Q factor.

The inductor described in Patent Document 1, however, cannot fulfill the above-described requirement.

The present invention provides an inductor having a high inductance, excellent superimposed DC current characteristics, and an excellent Q factor, MEANS FOR SOLVING THE PROBLEM The present invention [1] includes an inductor including a first wire and a second wire adjacent to each other and separated by an interval; a first magnetic layer having a first surface continuing in a surface direction, a second surface separated from the first surface by an interval in a thickness direction, and continuing in the surface direction, and an inner peripheral surface located between the first surface and the second surface, being in contact with an outer peripheral surface of the first wire and an outer peripheral surface of the second wire, the first magnetic layer containing approximately spherical-shaped magnetic particles and resin; a second magnetic layer having a third surface being in contact with the first surface, and a fourth surface separated from the third surface in the thickness direction, the second magnetic layer containing approximately flat-shaped magnetic particles and the and resin; and a third magnetic layer having a fifth surface being in contact with the second surface, and a sixth surface separated from the fifth surface by an interval in the thickness direction, the third magnetic layer containing approximately flat-shaped magnetic particles and resin, wherein each of a relative permeability of the second magnetic layer and a relative permeability of the third magnetic layer is higher than a relative permeability of the first magnetic layer, the third surface has a first concave portion caving in from a first facing portion facing the first wire in the thickness direction and a second facing portion facing the second wire in the thickness direction between the first facing portion and the second facing portion, the fourth surface has a second concave portion caving in from a third facing portion facing the first facing portion in the thickness direction and a fourth facing portion facing the second facing portion in the thickness direction between the third facing portion and the fourth facing portion, the fifth surface has a third concave portion caving in from a fifth facing portion facing the first wire in the thickness direction and a sixth facing portion facing the second wire in the thickness direction between the fifth facing portion and the sixth facing portion, and the sixth surface has a fourth concave portion caving in from a seventh facing portion facing the fifth facing portion in the thickness direction and an eighth facing portion facing the second facing portion in the thickness direction between the seventh facing portion and the eighth facing portion.

The inductor 1 includes the first magnetic layer containing the approximately spherical magnetic particles, and the second magnetic layer and the third magnetic layer each containing the approximately flat magnetic particles. Further, each of the second magnetic layer and the third magnetic layer has a relative permeability higher than that of the first magnetic layer. Thus, the inductor has a high inductance, and excellent superimposed DC current characteristics.

Furthermore, the second magnetic layer has the first concave portion and the second concave portion. Thus, the approximately flat magnetic particles can be oriented toward the first concave portion and the second concave portion in a region surrounded by the first concave portion and the second concave portion in the second magnetic layer. In addition, the third magnetic layer has the third concave portion and the fourth concave portion. Thus, the approximately flat magnetic particles can be oriented toward the third concave portion and the fourth concave portion in a region surrounded by the third concave portion and the fourth concave portion in the third magnetic layer. Thus, an excellent Q factor can be achieved.

Accordingly, the inductor has a high inductance, excellent superimposed DC current characteristics, and an excellent Q factor.

The present invention [2] includes the inductor described in [1], wherein a length L1 between the first facing portion and the first wire, a length L2 between the second facing portion and the second wire, and a depth L3 of the first concave portion satisfy formula (1) and formula (2) described below, and a length L4 between the fifth facing portion and the first wire, a length L5 between the sixth facing portion and the second wire, and a depth L6 of the third concave portion satisfy formula (3) and formula (4) described below.

$$L3/L1 \geq 0.2 \quad (1)$$

$$L3/L2 \geq 0.2 \quad (2)$$

$$L6/L4 \geq 0.2 \quad (3)$$

$$L6/L5 \geq 0.2 \quad (4)$$

The present invention [3] includes the inductor described in [1] or [2] above, wherein a depth L3 of the first concave portion and a depth L7 of the second concave portion satisfy formula (5) described below, and a depth L6 of the third concave portion and a depth L8 of the fourth concave portion satisfy formula (6) described below.

$$L7/L3 \geq 0.3 \quad (5)$$

$$L8/L6 \geq 0.3 \quad (6)$$

The present invention [4] includes the inductor described in any one of the above-described [1] to [3], wherein a length L1 between the first facing portion and the first wire and a thickness-direction length L9 of the first wire satisfy formula (7) described below, a length L2 between the second facing portion and the second wire and a thickness-direction length L10 of the second wire satisfy formula (8) described below, a length L4 between the fifth facing portion and the first wire and the length L9 of the first wire satisfy formula (9) described below, and a length L5 between the sixth facing portion and the second wire and the length L10 of the second wire satisfy formula (10) described below.

$$L1/L9 \geq 0.1 \quad (7)$$

$$L2/L10 \geq 0.1 \quad (8)$$

$$L4/L9 \geq 0.1 \quad (9)$$

$$L5/L10 \geq 0.1 \quad (10)$$

Effects of the Invention

The inductor of the present invention has a high inductance, excellent superimposed DC current characteristics, and an excellent Q factor.

BRIEF DESCRIPTION OF THE DRAWINGS

FIG. 4 illustrates the third step of setting the magnetic sheet, the first wire, and the second wire in the heat press machine in the method of producing the inductor.

Following FIG. 4.

FIG. 6 illustrates the fifth step of forming a second confined space in reduced-pressure atmosphere by pressing an internal frame member to the first mold in the method of producing the inductor.

Following FIG. 6.

Following FIG. 7.

DESCRIPTION OF THE EMBODIMENTS

Embodiment

Figure 1:
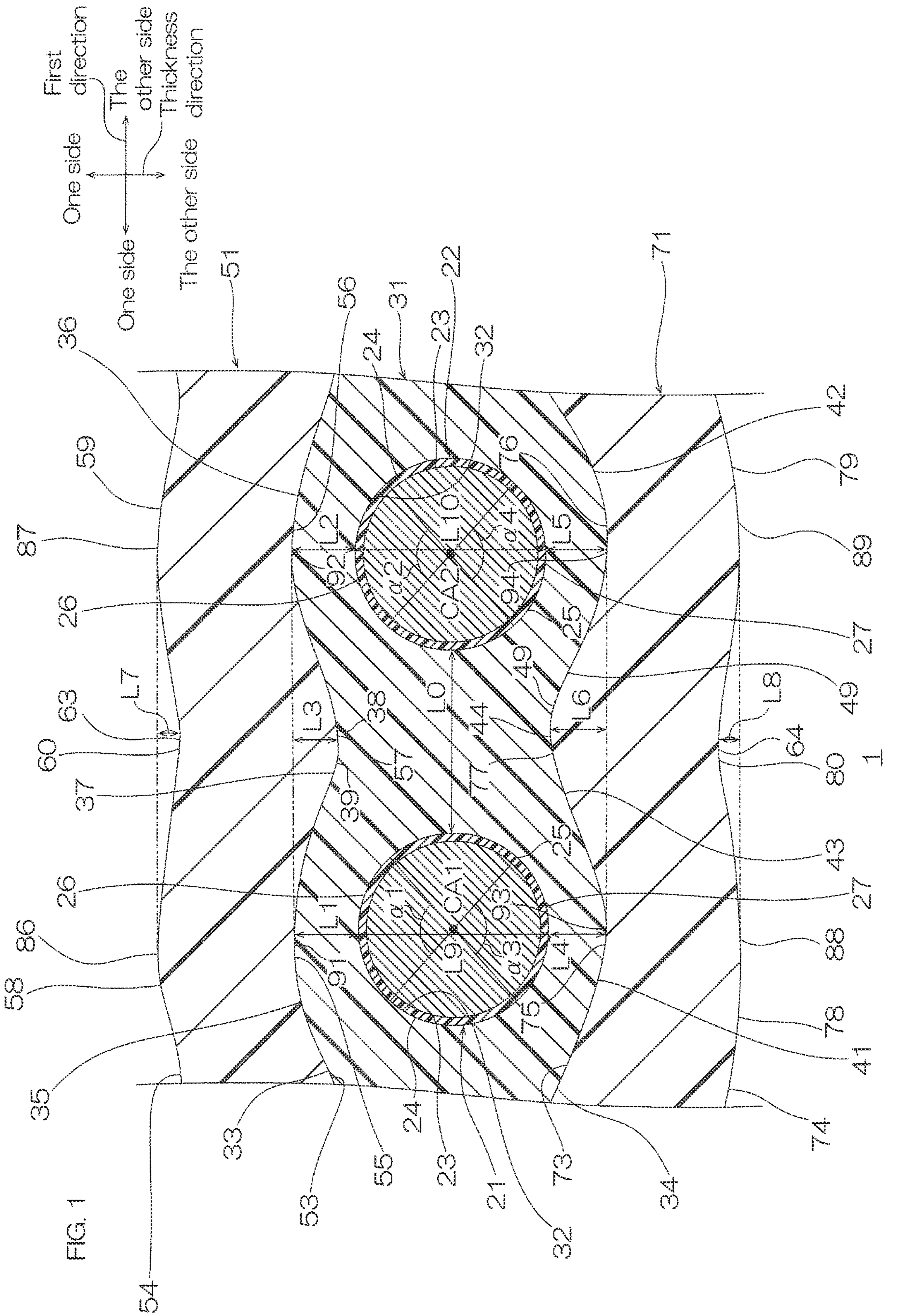
FIG. 1 is a cross-sectional view of an embodiment of the inductor of the present invention.

An embodiment of the inductor of the present invention is described with reference to FIG. 1 and FIG. 2.

The inductor 1 has an approximate sheet shape extending in a surface direction orthogonal to a thickness direction. The inductor 1 includes a first wire 21 and a second wire 22, a first magnetic layer 31, a second magnetic layer 51, and a third magnetic layer 71.

The first wire 21 and the second wire 22 are adjacent to each other, holding an interval therebetween in a first direction orthogonal to an electric power transmission direction in which the electricity is transmitted (a second direction) (an extending direction) and the thickness direction. The first direction and the second direction are included in the surface direction and orthogonal to each other in the surface direction. As for the first wire 21 and the second wire 22, the first wire 21 is disposed at one side in the first direction while the second wire 22 is disposed at the other side in the first direction. Each of the first wire 21 and the second wire 22 has, for example, an approximately circular shape in the cross sectional view. Each of the first wire 21 and the second wire 22 has an outer peripheral surface 25 facing the first magnetic layer 31 described next. Each of the first wire 21 and the second wire 22 includes a conductive wire 23, and an insulating film 24 covering the conductive wire 23.

The conductive wire 23 has an approximately circular shape sharing its central axis with the first wire 21 and the second wire 22 in the cross sectional view. The material of the conductive wire 23 is a metal conductor such as copper. The lower limit of the radius of the conductive wire 23 is, for example, 25 μm, and the upper limit thereof is, for example, 2,000 μm.

The insulating film 24 fully covers a peripheral surface of the conductive wire 23. The insulating film 24 has an approximately circular ring shape sharing its central axis with the first wire 21 and the second wire 22 in the cross sectional view. Examples of the material of the insulating film 24 include insulating resins such as polyester, polyurethane, polyesterimide, polyamide imide, and polyimide. The insulating film 24 is a single layer or multiple-layered. The lower limit of the thickness of the insulating film 24 is, for example, 1 μm. The upper limit thereof is, for example, 100 μm.

The radius of each of the first wire 21 and the second wire 22 is the sum of the radius of the conductive wire 23 and the thickness of the insulating film 24. Specifically, the lower limit thereof is, for example, 25 μm, preferably, 50 μm. The upper limit thereof is, for example, 2,000 μm, preferably, 200 μm.

The lower limit of a distance (interval) L0 between the first wire 21 and the second wire 22 is appropriately set depending on the use and purpose of the inductor 1, and is, for example, 10 μm, preferably, 50 μm. The upper limit thereof is, for example, 10,000 μm, preferably, 5,000 μm.

The first magnetic layer 31 has an inner peripheral surface 32, a first surface 33, and a second surface 34.

The inner peripheral surface 32 is brought into contact with the outer peripheral surfaces 25 of the first wire 21 and the second wire 22. The inner peripheral surface 32 is located between the first surface 33 and the second surface 34 in the thickness direction as described next.

The first surface 33 continues in the surface direction. The first surface 33 is disposed at the one side in the thickness direction of the inner peripheral surface 32, holding an interval therebetween. The first surface 33 is a one surface in the thickness direction of the first magnetic layer 31. The first surface 33 has a first protrusion portion 35, a second protrusion portion 36, and a one-side concave portion 37.

The first protrusion portion 35 faces a one-side surface 26 in the thickness direction of the outer peripheral surface 25 of the first wire 21 in the cross-sectional view along the thickness direction and the first direction (hereinafter, referred to merely as "cross-sectional view"). When the first wire 21 has an approximately circular shape in the cross sectional view, the upper limit of a central angle α1 of the one-side surface 26 of the first wire 21 is, for example, 90 degrees, preferably, 60 degrees, and the lower limit thereof is, for example, 15 degrees, preferably, 30 degrees. The central angle α1 of the one-side surface 26 of the first wire 21 is determined while a central axis CA1 of the first wire 21 is set as a center. The first protrusion portion 35 is a region overlapping the one-side surface 26 when being projected from the central axis CA1 (or the center of gravity) of the first wire 21 in a radiation direction. The first protrusion portion 35 curves along the one-side surface 26 of the first wire 21. A curve direction in which the first protrusion portion 35 curves is the same as the direction in which the one-side surface 26 of the first wire 21 does.

The second protrusion portion 36 faces the one-side surface 26 in the thickness direction of the outer peripheral surface 25 of the second wire 22, holding an interval therebetween in the cross-sectional view. When the second wire 22 has an approximately circular shape in the cross sectional view, the upper limit of a central angle α2 of the one-side surface 26 of the second wire 22 is, for example, 90 degrees, preferably, 60 degrees, and the lower limit thereof is, for example, 15 degrees, preferably, 30 degrees. The central angle α2 of the one-side surface 26 of the second wire 22 is determined while a central axis CA2 of the second wire 22 is set as a center. The second protrusion portion 36 is a region overlapping the one-side surface 26 when being projected from the central axis CA2 (or the center of gravity) of the second wire 22 in a radiation direction. The second protrusion portion 36 curves along the one-side surface 26 of the second wire 22. A curve direction in which the second protrusion portion 36 curves is the same as the direction in which the one-side surface 26 of the second wire 22 does.

The one-side concave portion 37 is disposed between the first protrusion portion 35 and the second protrusion portion 36. The one-side concave portion 37 connects the first protrusion portion 35 to the second protrusion portion 36 in the first direction. The one-side concave portion 37 does not overlap the first wire 21 and the second wire 22 when being projected in the thickness direction, and is disposed between the first wire 21 and the second wire 22. The one-side concave portion 37 caves in from the first protrusion portion 35 and the second protrusion portion 36 to the other side in the thickness direction.

The second surface 34 faces the first surface 33 at the other side in the thickness direction, holding an interval therebetween. The second surface 34 is located at an opposite side to the first surface 33 with respect to the first wire 21 and the second wire 22. The second surface 34 is the other surface in the thickness direction of the first magnetic layer 31. The second surface 34 continues in the surface direction. The second surface 34 has a third protrusion portion 41, a fourth protrusion portion 42, and the other-side concave portion 43.

The third protrusion portion 41 faces the other-side surface 27 in the thickness direction of the outer peripheral surface 25 of the first wire 21 in the cross-sectional view, holding an interval therebetween. When the first wire 21 has an approximately circular shape in the cross sectional view, the upper limit of a central angle β of the other-side surface 27 is, for example, 90 degrees, preferably, 60 degrees, and the lower limit thereof is, for example, 15 degrees, preferably, 30 degrees. The central angle α3 of the other-side surface 27 is determined while the central axis CA1 of the first wire 21 is set as a center. The third protrusion portion 41 is a region overlapping the other-side surface 27 when being projected from the central axis CA1 of the first wire 21 (or the center of gravity) in a radiation direction. The third protrusion portion 41 curves along the other-side surface 27 of the first wire 21. A curve direction in which the third protrusion portion 41 curves is the same as the direction in which the other-side surface 27 of the first wire 21 does.

The fourth protrusion portion 42 faces the other-side surface 27 in the thickness direction of the outer peripheral surface 25 of the second wire 22 in the cross-sectional view, holding an interval therebetween. When the second wire 22 has an approximately circular shape in the cross sectional view, the upper limit of a central angle α4 of the other-side surface 27 is, for example, 90 degrees, preferably, 60 degrees, and the lower limit thereof is, for example, 15 degrees, preferably, 30 degrees. The central angle α4 of the other-side surface 27 is determined while the central axis CA2 of the second wire 22 is set as a center. The fourth protrusion portion 42 is a region overlapping the other-side surface 27 when being projected from the central axis CA2 (or the center of gravity) of the second wire 22 in a radiation direction. The fourth protrusion portion 42 curves along the other-side surface 27 of the second wire 22. A curve direction in which the fourth protrusion portion 42 curves is the same as the direction in which the other-side surface 27 of the second wire 22 does.

The other-side concave portion 43 is disposed between the third protrusion portion 41 and the fourth protrusion portion 42. The other-side concave portion 43 connects the third protrusion portion 41 to the fourth protrusion portion 42 in the first direction. The other-side concave portion 43 does not overlap the first wire 21 and the second wire 22 when being projected in the thickness direction, and is disposed between the first wire 21 and the second wire 22. The other-side concave portion 43 caves in from the third protrusion portion 41 and the fourth protrusion portion 42 to the one side in the thickness direction.

The material, properties, and dimensions of the first magnetic layer 31 are described below.

The second magnetic layer 51 is disposed on the first surface 33 of the first magnetic layer 31. The second magnetic layer 51 has a third surface 53, and a fourth surface 54.

The third surface 53 is a contact surface in contact with the first surface 33 of the first magnetic layer 31. The third surface 53 continues in the surface direction. The third surface 53 is the other surface in the thickness direction of the second magnetic layer 51. The third surface 53 has a first facing portion 55, a second facing portion 56, and a first concave portion 57.

The first facing portion 55 is in contact with the first protrusion portion 35. Specifically, the first facing portion 55 has the same shape as that of the first protrusion portion 35 in the cross-sectional view. The first facing portion 55 includes a first top portion 91 located the closest to the one side in the thickness direction.

The second facing portion 56 is in contact with the second protrusion portion 36. Specifically, the second facing portion 56 has the same shape as that of the second protrusion portion 36 in the cross-sectional view. The second facing portion 56 includes a second top portion 92 located the closest to the one side in the thickness direction.

The first concave portion 57 is in contact with the one-side concave portion 37. The first concave portion 57 caves in toward the other side in the thickness direction between the first facing portion 55 and the second facing portion 56. Specifically, the first concave portion 57 has the same shape as that of the one-side concave portion 37. The first concave portion 57 has a first bottom portion 38 located the closest to the other side in the thickness direction. The first concave portion 57 includes a first arc surface 39 having a central axis located nearer to the one side in the thickness direction than the one-side concave portion 37 is. The first arc surface 39 includes the first bottom portion 38.

The fourth surface 54 faces the third surface 53 at the one side in the thickness direction, holding an interval therebetween. The fourth surface 54 forms the one surface in the thickness direction of each of the second magnetic layer 51 and the inductor 1. The fourth surface 54 is an exposed surface exposed to the one side in the thickness direction. The fourth surface 54 continues in the surface direction.

The fourth surface 54 has a third facing portion 58, a fourth facing portion 59, and a second concave portion 60.

The third facing portion 58 faces the first facing portion 55 of the third surface 53 in the thickness direction. The third facing portion 58 curves along the first facing portion 55 in the cross-sectional view. The third facing portion 58 has a fifth top portion 86 facing the one side in the thickness direction of the first top portion 91 of the first facing portion 55. The fifth top portion 86 is located the closest to the one side in the thickness direction in the third facing portion 58.

The fourth facing portion 59 faces the second facing portion 56 of the third surface 53 in the thickness direction. The fourth facing portion 59 curves along the second facing portion 56. The fourth facing portion 59 has a sixth top portion 87 facing the one side in the thickness direction of the second top portion 92. The sixth top portion 87 is located the closest to the one side in the thickness direction in the fourth facing portion 59.

The second concave portion 60 faces the first concave portion 57 of the third surface 53 in the thickness direction. The second concave portion 60 caves in toward the other side in the thickness direction between the third facing portion 58 and the fourth facing portion 59. The second concave portion 60 caves in toward the first concave portion 57. The second concave portion 60 has a third bottom portion 63 located the closest to the other side in the thickness direction. The third bottom portion 63 faces the first bottom portion 38 of the first concave portion 57 in the thickness direction.

The material, properties, and dimensions of the second magnetic layer 51 are described below.

The third magnetic layer 71 is disposed on the second surface 34 of the first magnetic layer 31. The third magnetic layer 71 has a fifth surface 73, and a sixth surface 74.

The fifth surface 73 is a contact surface in contact with the second surface 34 of the first magnetic layer 31. The fifth surface 73 continues in the surface direction. The fifth surface 73 is the one surface in the thickness direction of the third magnetic layer 71. The fifth surface 73 has a fifth facing portion 75, a sixth facing portion 76, and a third concave portion 77.

The fifth facing portion 75 is in contact with the third protrusion portion 41. Specifically, the fifth facing portion 75 has the same shape as that of the third protrusion portion 41 in the cross-sectional view. The fifth facing portion 75 has a third top portion 93 located the closest to the other side in the thickness direction.

The sixth facing portion 76 is in contact with the fourth protrusion portion 42. Specifically, the sixth facing portion 76 has the same shape as that of the fourth protrusion portion 42 in the cross-sectional view. The sixth facing portion 76 has a fourth top portion 94 located the closest to the other side in the thickness direction.

The third concave portion 77 is in contact with the other-side concave portion 43. The third concave portion 77 caves in toward the one side in the thickness direction between the fifth facing portion 75 and the sixth facing portion 76. Specifically, the third concave portion 77 has the same shape as that of the other-side concave portion 43. The third concave portion 77 has a second bottom portion 44 located the closest to the one side in the thickness direction. The third concave portion 77 includes a second arc surface 49 having a central axis located nearer to the other side in the thickness direction than the other-side concave portion 43 is. The second arc surface 49 includes the second bottom portion 44.

The sixth surface 74 faces the fifth surface 73 at the other side in the thickness direction, holding an interval therebetween. The sixth surface 74 forms the other surface in the thickness direction of each of the third magnetic layer 71 and the inductor 1. The sixth surface 74 is an exposed surface exposed to the other side in the thickness direction. The sixth surface 74 continues in the surface direction.

The sixth surface 74 has a seventh facing portion 78, an eighth facing portion 79, and a fourth concave portion 80.

The seventh facing portion 78 faces the fifth facing portion 75 of the fifth surface 73 in the thickness direction. The seventh facing portion 78 curves along the fifth facing portion 75 in the cross-sectional view. The seventh facing portion 78 has a seventh top portion 88 facing the third top portion 93 of the fifth facing portion 75 at the other side in the thickness direction. The seventh top portion 88 is located the closest to the other side in the thickness direction in the seventh facing portion 78.

The eighth facing portion 79 faces the sixth facing portion 76 of the fifth surface 73 in the thickness direction. The eighth facing portion 79 curves along the sixth facing portion 76 in the cross-sectional view. The eighth facing portion 79 has an eighth top portion 89 facing the fourth top portion 94 of the sixth facing portion 76 at the other side in the thickness direction. The eighth top portion 89 is located the closest to the other side in the thickness direction in the eighth facing portion 79.

The fourth concave portion 80 faces the third concave portion 77 of the fifth surface 73 in the thickness direction. The fourth concave portion 80 caves in toward the one side in the thickness direction between the seventh facing portion 78 and the eighth facing portion 79. The fourth concave portion 80 caves in along the third concave portion 77. The fourth concave portion 80 has a fourth bottom portion 64 located the closest to the one side in the thickness direction. The fourth bottom portion 64 faces the second bottom portion 44 of the third concave portion 77 in the thickness direction.

Next, the material, properties, and dimensions of the first magnetic layer 31, the second magnetic layer 51 and the third magnetic layer 71 are described.

The material of the first magnetic layer 31, the second magnetic layer 51, and the third magnetic layer 71 is a magnetic composition containing magnetic particles and resin.

The magnetic material making up the magnetic particles is, for example, a soft magnetic body and a hard magnetic body. For the inductance, preferably, the soft magnetic body is used.

Examples of the soft magnetic body include a single metal body containing one metal element as a pure material; and an alloy body that is an eutectic body (mixture) of one or more metal element(s) (the first metal element(s)), and one or more metal element(s) (the second metal element(s)) and/or a non-metal element(s) (such as carbon, nitrogen, silicon, and phosphorus). These can be used singly or in combination of two or more.

Examples of the single metal body include a single metal consisting of one metal element (the first metal element). The first metal element is appropriately selected from metal elements that can be contained as the first metal element of the soft magnetic body, such as iron (Fe), cobalt (Co), nickel (Ni), and other metal elements.

The single metal body is, for example, in a state in which the single metal body includes a core including only one metal element and a surface layer containing an inorganic and/or organic material(s) that modifies the whole or a part of the surface of the core, or a state in which an organic metal compound and inorganic metal compound containing the first metal element is (thermally) decomposed. A more specific example of the latter state is iron powder (may be referred to as carbonyl iron powder) made of a thermally decomposed organic iron compound (specifically, carbonyl iron) including iron as the first metal element. The position of the laver including the inorganic and/or organic material(s) that modifies a part including only one metal element is not limited to the above-described surface. An organic metal compound or inorganic metal compound from which the single metal body can be obtained is not limited, and can appropriately be selected from known or common organic metal compounds and inorganic metal compounds from which the single metal body can be obtained.

The alloy body is an eutectic body of one or more metal element(s) (the first metal element(s)), and one or more metal element(s) (the second metal element(s)) and/or a non-metal element(s) (such as carbon, nitrogen, silicon, and phosphorus), and is not especially limited as long as the alloy body can be used as an alloy body of the soft magnetic body.

The first metal element is an essential element in the alloy body. Examples thereof include iron (Fe), cobalt (Co), and nickel (Ni). When the first metal element is Fe, the alloy body is an Fe-based alloy. When the first metal element is Co, the alloy body is a Co-based alloy. When the first metal element is Ni, the alloy body is a Ni-based alloy.

The second metal element is an element (accessory component) secondarily contained in the alloy body, and a metal element compatible (eutectic) with the first metal element. Examples thereof include iron (Fe) (when the first metal element is other than Fe), cobalt (Co) (when the first metal element is other than Co), nickel (Ni) (when the first metal element is other than Ni), chromium (Cr), aluminum (Al), silicon (Si), copper (Cu), silver (Ag), manganese (Mn), calcium (Ca), barium (Ba), titanium (Ti), zirconium (Zr), hafnium (Hf), vanadium (V), niobium (Nb), tantalum (Ta), molybdenum (Mo), tungsten (W), ruthenium (Ru), rhodium (Rh), zinc (Zn), gallium (Ga), indium (In), germanium (Ge), tin (Sn), lead (Pb), scandium (Sc), yttrium (Y), strontium (Sr), and various rare-earth elements. These can be used singly or in combination of two or more.

The non-metal element is an element (accessory component) secondarily contained in the alloy body, and a non-metal element compatible (eutectic) with the first metal element. Examples thereof include boron (B), carbon (C), nitrogen (N), silicon (Si), phosphorus (P), and sulfur (S). These can be used singly or in combination of two or more.

Examples of the Fe-based alloy as an exemplary alloy body include magnetic stainless steels (Fe—Cr—Al—Si Alloys) (including an electromagnetic stainless steel), sendust alloys (Fe—Si—Al alloys) (including a super sendust alloy), permalloys (Fe—Ni alloy), Fe—Ni—Mo alloys. Fe—Ni—Mo—Cu alloys, Fe—Ni—Co alloys. Fe—Cr alloys. Fe—Cr—Al alloys. Fe—Ni—Cr alloys, Fe—Ni—Cr—Si alloys, silicon coppers (Fe—Cu—Si alloys), Fe—Si alloys, Fe—Si—B (—Cu—Nb) alloys, Fe—B—Si—Cr alloys, Fe—Si—Cr—Ni alloys, Fe—Si—Cr alloys, Fe—Si—Al—Ni—Cr alloys. Fe—Ni—Si—Co alloys. Fe—N alloys, Fe—C alloys. Fe—B alloys, Fe—P Alloys, ferrites (including a stainless steel ferrite, and further including soft ferrites such as a Mn—Mg-based ferrite, a Mn—Zn-based ferrite, a Ni—Zn-based ferrite, a Ni—Zn—Cu-based ferrite, a Cu—Zn-based ferrite, and a Cu—Mg—Zn-based ferrite), permendurs (Fe—Co alloys), Fe—Co—V alloys, and Fe group amorphous alloys.

Examples of the Co-based alloy as an exemplary alloy body include Co—Ta—Zr, and cobalt (Co) group amorphous alloys.

Examples of the Ni-based alloy as an exemplary alloy body include Ni—Cr alloys.

Figure 2:
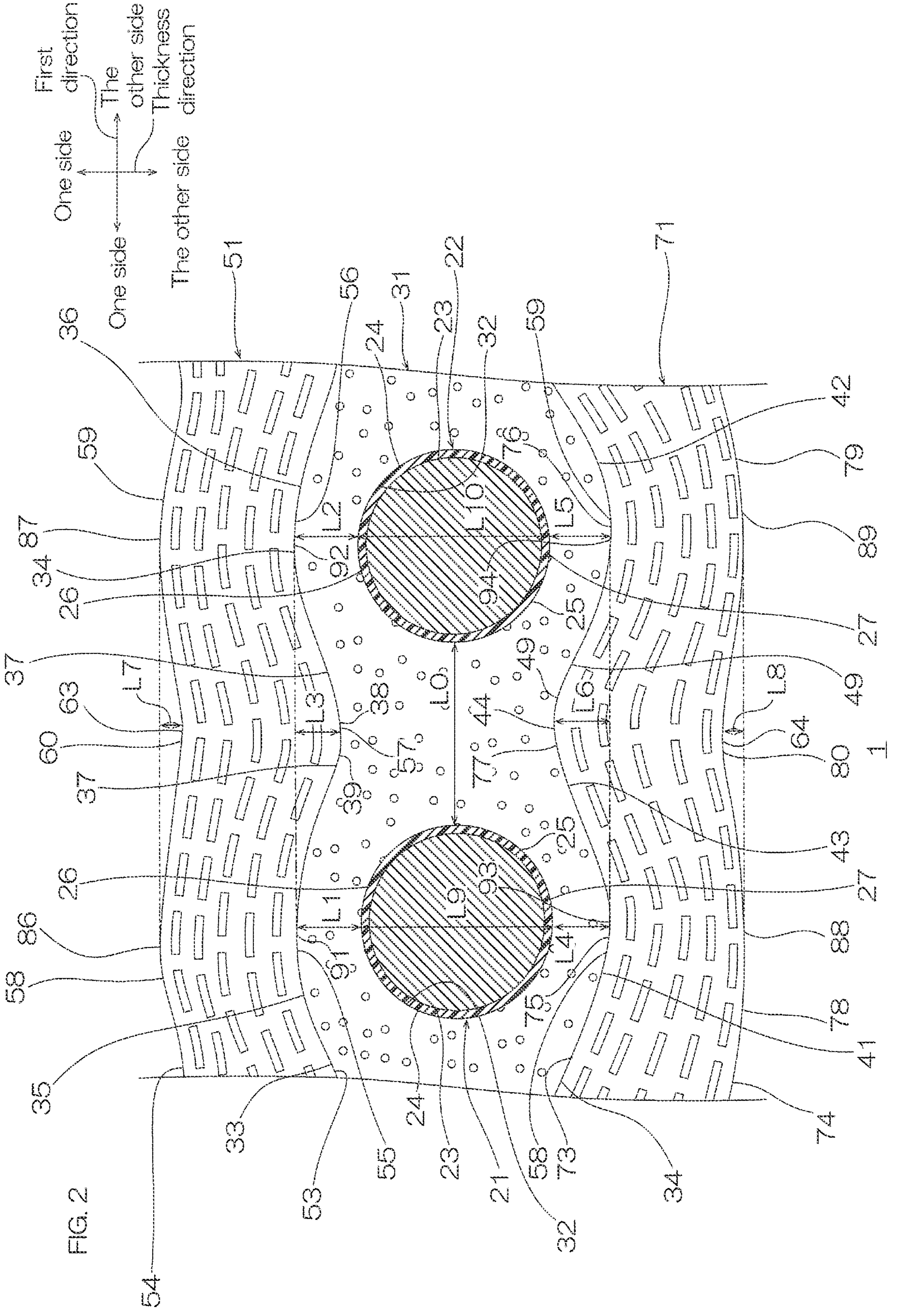
FIG. 2 is a cross-sectional view illustrating the magnetic particles contained in the first magnetic layer, the second magnetic layer, and the third magnetic layer in the inductor in FIG. 1.

As illustrated in FIG. 2, the magnetic particles contained in the first magnetic layer 31 have an approximately spherical shape. Meanwhile, the magnetic particles contained in the second magnetic layer 51 and the third magnetic layer 71 have an approximately flat shape (board shape). Thus, the approximately spherical magnetic particles of the first magnetic layer 31 improves the superimposed DC current characteristics while the approximately flat magnetic particles of the second magnetic layer 51 and the third magnetic layer 71 can achieve a high inductance, and an excellent Q factor.

The lower limit of the average value of maximum lengths of the magnetic particles is, for example, 0.1 μm, preferably, 0.5 μm. The upper limit thereof is, for example, 200 μm, preferably, 150 μm. The average value of maximum lengths of the magnetic particles is calculated as the median particle size of the magnetic particles.

The volume ratio (filling rate) of the magnetic particles in the magnetic composition is, for example, 10% by volume or more and, for example, 90% by volume or less.

Examples of the resin include thermosetting resin. Examples of the thermosetting resin include epoxy resin, melamine resin, thermosetting polyimide resin, unsaturated polyester resin, polyurethane resin, and silicone resin. In view of adhesiveness and heat resistance, preferably, epoxy resin is used.

When the thermosetting resin include epoxy resin, the thermosetting resin may be prepared as an epoxy resin composition containing an epoxy resin (such as cresol novolak epoxy resin), a curing agent (such as phenol resin), and a curing accelerator (such as an imidazole compound) in an appropriate ratio.

The parts by volume of the thermosetting resin to 100 parts by volume of the magnetic particles are, for example, 10 parts by volume or more and, for example, 90 parts by volume or less.

The resin may contain a thermoplastic resin such as acrylic resin in an appropriate ratio. The detailed formula of the above-described magnetic composition is described, for example, in Japanese Unexamined Patent Publication No. 2014-165363.

The relative permeability of each of the first magnetic layer 31, the second magnetic layer 51, and the third magnetic layer 71 is measured at a frequency of 10 MHz. The relative permeability of each of the second magnetic layer 51 and the third magnetic layer 71 is higher than the relative permeability of the first magnetic layer 31. Specifically, the ratio of the relative permeability of each of the second magnetic layer 51 and the third magnetic layer 71 to the relative permeability of the first magnetic layer 31 is, for example, more than 1; and the lower limit thereof is preferably, 1.1, more preferably, 1.5; and the upper limit thereof is, for example, 20, preferably, 10.

The relative permeability of each of the second magnetic layer 51 and the third magnetic layer 71 is higher than the relative permeability of the first magnetic layer 31. Thus, the inductor 1 has excellent superimposed DC current characteristics.

Figure 4:
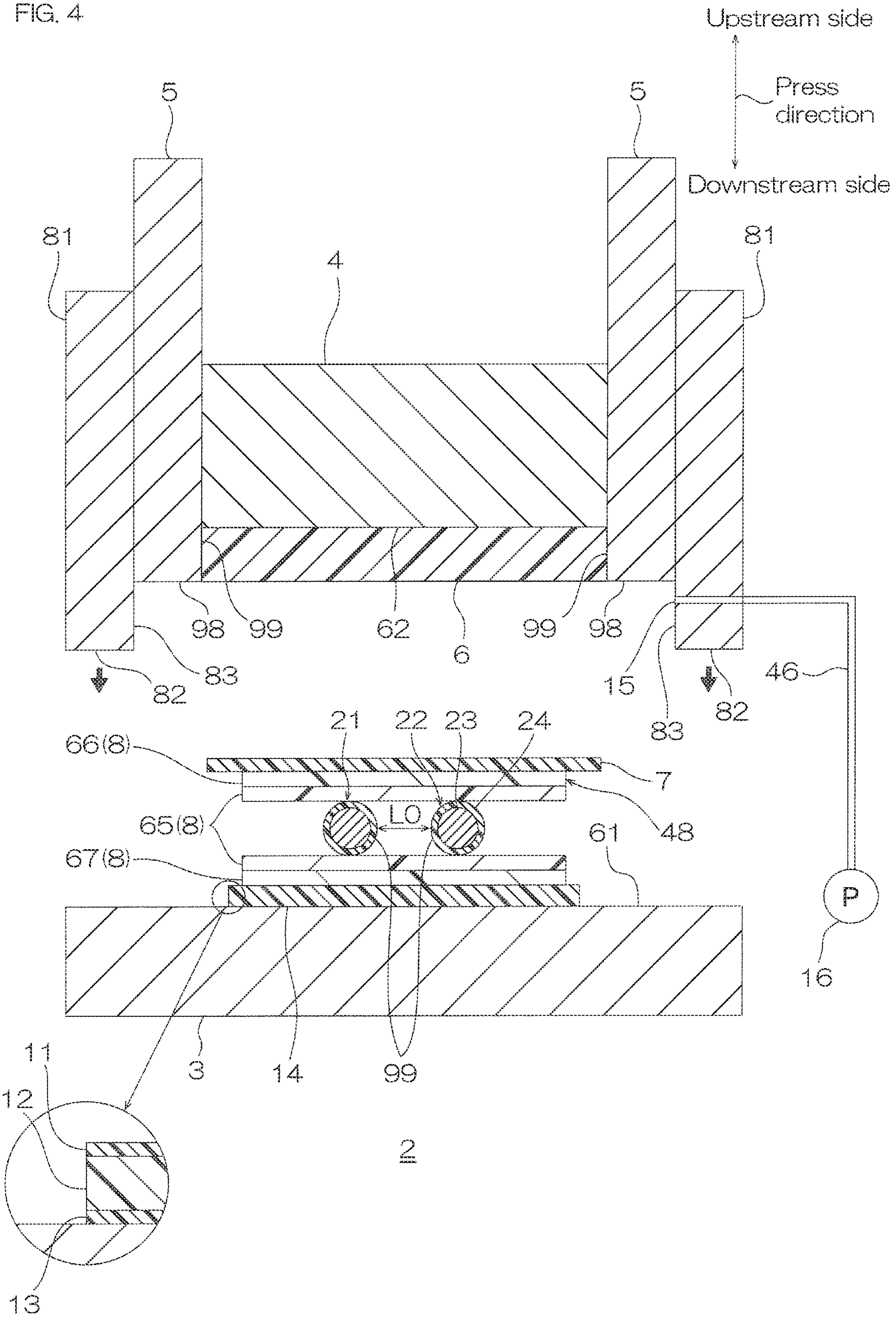
FIG. 4 Following FIG. 3.
Figure 5:
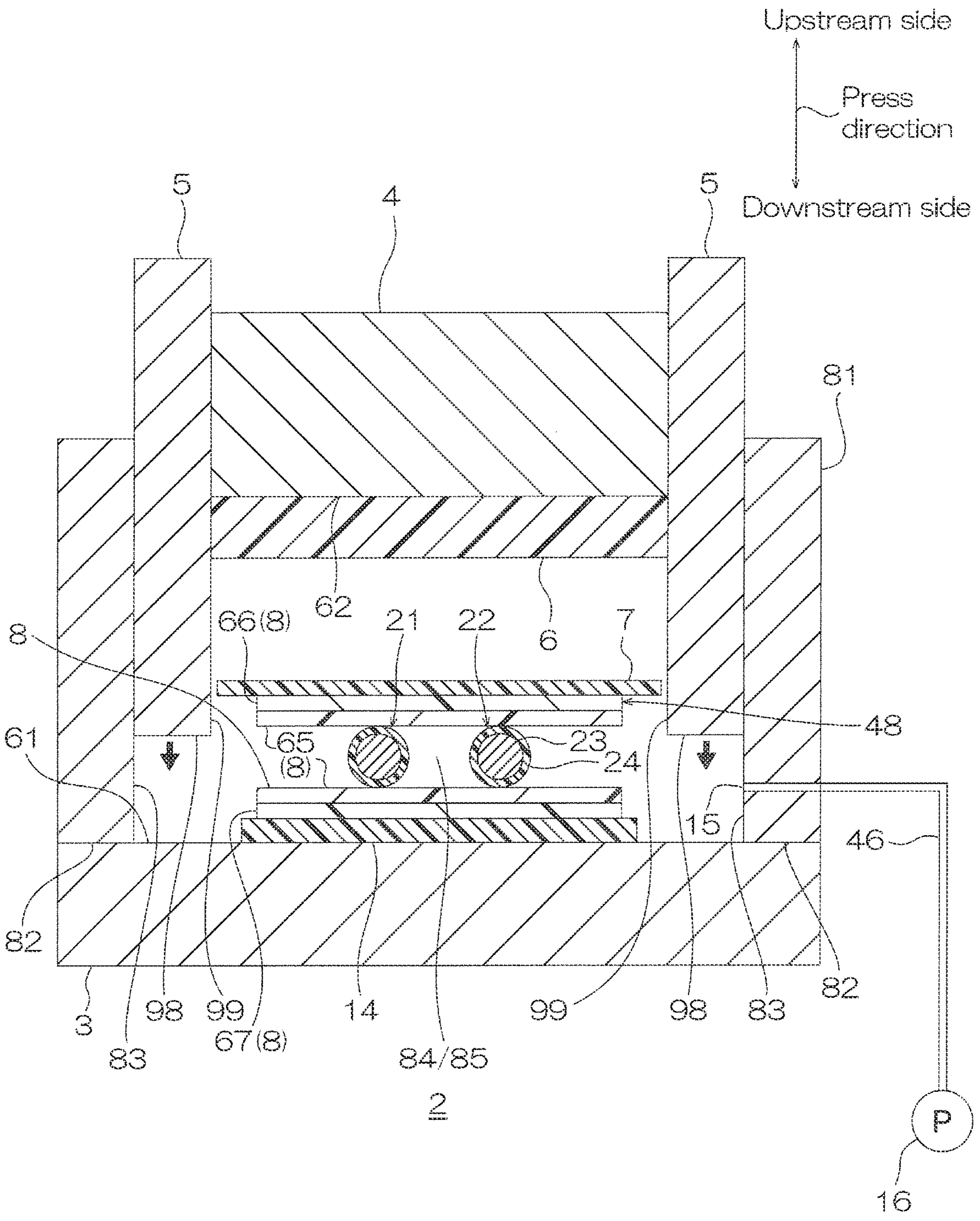
FIG. 5 illustrates the fourth step of forming a decompression space by forming a first confined space by a tight contact between an external frame member and a first mold and then reducing the pressure in the first confined space in the method of producing the inductor.
Figure 6:
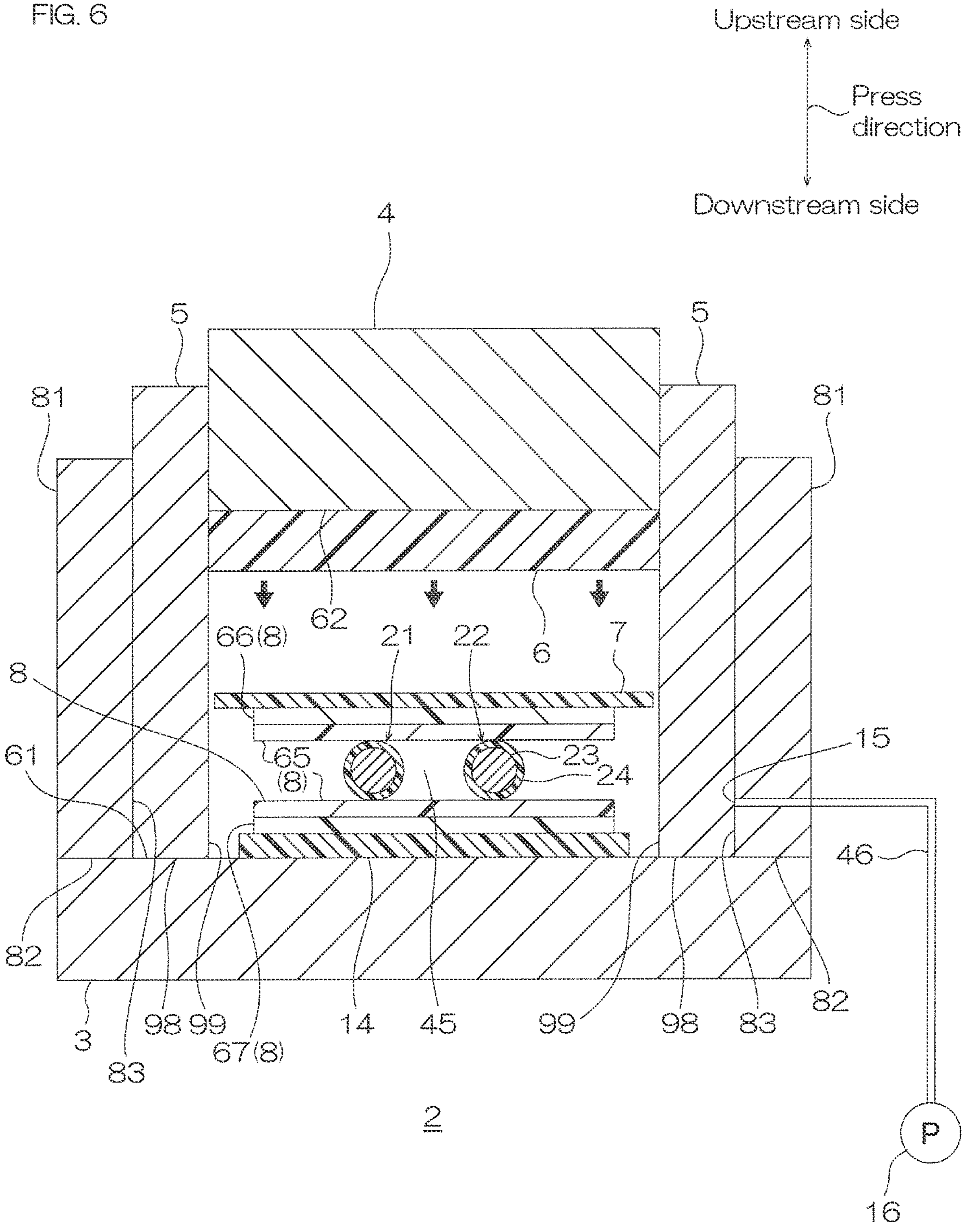
FIG. 6 Following FIG. 5.

The relative permeabilities of the first magnetic layer 31, the second magnetic layer 51, and the third magnetic layer 71 are obtained by measuring the relative permeabilities of the first sheet 65, the second sheet 66, and the third sheet 67 for forming the first to third magnetic layers, respectively (see FIG. 4 to FIG. 6). Alternatively, the relative permeabilities of the first magnetic layer 31, the second magnetic layer 51, and the third magnetic layer 71 can directly be measured.

Next, the dimensions of the first magnetic layer 31, the second magnetic layer 51, and the third magnetic layer 71 are described.

A length L1 between the first facing portion 55 and the first wire 21, a length L2 between the second facing portion 56 and the second wire 22, and a depth L3 of the first concave portion satisfy, for example, the following formula (1) and the following formula (2), preferably, the following formula (1A) and the following formula (2A), more preferably, the following formula (1B) and the following formula (2B), and satisfy, for example, the following formula (1C) and the following formula (2C).

$$L3/L1 \geq 0.2 \tag{1}$$

$$L3/L2 \geq 0.2 \tag{2}$$

$$L3/L1 \geq 0.3 \tag{1A}$$

$$L3/L2 \geq 0.3 \tag{2A}$$

$$L3/L1 \geq 0.4 \tag{1B}$$

$$L3/L2 \geq 0.4 \tag{2B}$$

$$L3/L1 < 1.5 \tag{1C}$$

$$L3L2 < 1.5 \tag{2C}$$

When L1, L2, and L3 satisfy the above-described formulas, the depth L3 of the first concave portion 57 can be large enough with respect to the length L1 between the first facing portion 55 and the first wire 21 and the length L2 between the second facing portion 56 and the second wire 22. Thus, as illustrated in FIG. 2, the approximately flat magnetic particles in proximity to the first concave portion 57 of the second magnetic layer 51 can sufficiently be oriented toward the first concave portion 57. As a result, the Q factor of the inductor 1 can be improved.

The lower limit of the ratio (L2/L1) of the length L2 between the second facing portion 56 and the second wire 22 to the length L1 between the first facing portion 55 and the first wire 21 is, for example, 0.7, preferably, 0.9, and the upper limit thereof is, for example, 1.3, preferably. 1.1.

A length L4 between the fifth facing portion 75 and the first wire 21, a length L5 between the sixth facing portion 76 and the second wire 22, and a depth L6 of the third concave portion 77 satisfy, for example, the following formula (3) and the following formula (4), preferably, the following formula (3A) and the following formula (4A), more preferably, the following formula (3B) and the following formula (4B), and satisfy, for example, the following formula (3C) and the following formula (4C).

$$L6/L4 \geq 0.2 \tag{3}$$

$$L6/L5 \geq 0.2 \tag{4}$$

$$L6/L4 \geq 0.3 \tag{3A}$$

$$L6/L5 \geq 0.3 \tag{4A}$$

$$L6/L4 \geq 0.4 \tag{3B}$$

$$L6/L5 \geq 0.4 \tag{4B}$$

$$L6/L4 \leq 1.5 \tag{3C}$$

$$L6/L5 < 1.5 \tag{4C}$$

When L4, L5, and L6 satisfy the above-described formulas, the depth L6 of the third concave portion 77 can be large enough with respect to the length L4 between the fifth facing portion 75 and the first wire 21 and the length L5 between the sixth facing portion 76 and the second wire 22. Thus, the approximately flat magnetic particles in proximity to the third concave portion 77 in the third magnetic layer 71 can sufficiently be oriented toward the third concave portion 77. As a result, the Q factor of the inductor 1 can be improved.

L1 to L6 satisfy, for example, the formula (1), the formula (2), the formula (3), and the formula (4) simultaneously, preferably, the formula (1A), the formula (2A), the formula (3A), and the formula (4A) simultaneously, more preferably, the formula (1B), the formula (2B), the formula (3B) and the formula (4B) simultaneously, even more preferably, the formula (1C), the formula (2C), the formula (3C) and the formula (4C) simultaneously. This can efficiently improve the Q factor of the inductor 1.

The lower limit of the ratio (L5/L4) of the length L5 between the sixth facing portion 76 and the second wire 22 to the length L4 between the fifth facing portion 75 and the first wire 21 is, for example, 0.7, preferably, 0.9, and the upper limit thereof is, for example, 1.3, preferably, 1.1.

For example, the depth L3 of the first concave portion 57 and a depth L7 of the second concave portion 60 satisfy, for example, the following formula (5), preferably, the following formula (5A), more preferably, the following formula (5B), and satisfy, for example, the following formula (5C).

$$L7/L3 \geq 0.3 \tag{5}$$

$$L7/L3 \geq 0.5 \tag{5A}$$

$$L7/L3 \geq 0.7 \tag{5B}$$

$$L7/L3 < 1.0 \tag{5C}$$

When L3 and L7 satisfy the above-described formulas, the depth L7 of the second concave portion 60 can be large enough with respect to the depth L3 of the first concave portion 57. Thus, as illustrated in FIG. 2, the approximately flat magnetic particles between the first concave portion 57 and the second concave portion 60 can be sufficiently oriented along the first concave portion 57 and the deeply hollow second concave portion 60. As a result, the Q factor of the inductor 1 can be improved.

The depth L6 of the third concave portion 77 and a depth L8 of the fourth concave portion 80 satisfy, for example, the following formula (6), preferably, the following formula (6A), more preferably, the following formula (6B), and satisfy, for example, the following formula (6C).

$$L8/L6 \geq 0.3 \quad (6)$$

$$L8/L6 \geq 0.5 \quad (6A)$$

$$L8/L6 \geq 0.7 \quad (6B)$$

$$L8/L6 < 1.0 \quad (6C)$$

When L6 and L8 satisfy the above-described formulas, the depth L8 of the fourth concave portion 80 can be large enough with respect to the depth L6 of the third concave portion 77. Thus, as illustrated in FIG. 2, the approximately flat magnetic particles between the third concave portion 77 and the fourth concave portion 80 can be sufficiently oriented along the third concave portion 77 and the deeply hollow fourth concave portion 80. As a result, the Q factor of the inductor 1 can be improved.

The depth L3, and L6 to L8 satisfy, for example, the formula (5) and the formula (6) simultaneously, preferably, the formula (5A) and the formula (6A) simultaneously, more preferably, the formula (5B) and the formula (6B) simultaneously, more preferably, the formula (5C) and the formula (6C) simultaneously. This can efficiently improve the Q factor of the inductor 1.

For example, the length L1 between the first facing portion 55 and the first wire 21 and a thickness-direction length L9 of the first wire 21 satisfy, for example, the following formula (7), preferably, the following formula (7A), more preferably, the following formula (7B), and satisfy, for example, the following formula (7C).

$$L1/L9 \geq 0.1 \quad (7)$$

$$L1/L9 \geq 0.2 \quad (7A)$$

$$L1/L9 \geq 0.25 \quad (7B)$$

$$L1/L9 < 1.0 \quad (7C)$$

When L1 and L9 satisfy the above-described formulas, the length L1 between the first facing portion 55 and the first wire 21 can be large enough with respect to the thickness-direction length L9 of the first wire 21. Thus, the inductor 1 can maintain a high inductance while the Q factor of the inductor 1 can be improved.

The length L2 between the second facing portion 56 and the second wire 22 and a thickness-direction length L10 of the second wire 22 satisfy, for example, the following formula (8), preferably, the following formula (8A), more preferably, the following formula (8B), and satisfy, for example, the following formula (8C).

$$L2/L10 \geq 0.1 \quad (8)$$

$$L2/L10 \geq 0.2 \quad (8A)$$

$$L2/L10 \geq 0.25 \quad (8B)$$

$$L2/L10 < 1.0 \quad (8C)$$

When L2 and L10 satisfy the above-described formulas, the length L2 between the second facing portion 56 and the second wire 22 can be large enough with respect to the thickness-direction length L10 of the second wire 22. Thus, the inductor 1 can maintain a high inductance while the Q factor of the inductor 1 can be improved.

The length L4 between the fifth facing portion 75 and the first wire 21 and the length L9 of the first wire 21 satisfy, for example, the following formula (9), preferably, the following formula (9A), more preferably, the following formula (9B), and satisfy, for example, the following formula (9C)

$$L4/L9 \geq 0.1 \quad (9)$$

$$L4/L9 \geq 0.2 \quad (9A)$$

$$L4/L9 \geq 0.25 \quad (9B)$$

$$L4/L9 < 1.0 \quad (9C)$$

When L4 and L9 satisfy the above-described formulas, the length L4 between the fifth facing portion 75 and the first wire 21 is large enough with respect to the length L9 of the first wire 21. Thus, the inductor 1 can maintain a high inductance while the Q factor of the inductor 1 can be improved.

The length L5 between the sixth facing portion 76 and the second wire 22 and the length L10 of the second wire 22 satisfy the following formula (10), preferably, the following formula (10A), more preferably, the following formula (10B), and satisfy, for example, the following formula (1° C.).

$$L5/L10 \geq 0.1 \quad (10)$$

$$L5/L10 \geq 0.2 \quad (10A)$$

$$L5/L10 \geq 0.25 \quad (10B)$$

$$L5/L10 < 1.0 \quad (10C)$$

When L5 and L10 satisfy the above-described formulas, the length L5 between the sixth facing portion 76 and the second wire 22 can be large enough with respect to the length L10 of the second wire 22. Thus, the inductor 1 can maintain a high inductance while the Q factor of the inductor 1 can be improved.

The above-described L1, L2, L4, L5, L9, and L10 satisfy, for example, the formula (7), the formula (8), the formula (9) and the formula (10) simultaneously, preferably, the formula (7A), the formula (8A), the formula (9A) and the formula (10A) simultaneously, more preferably, the formula (7B), the formula (8B), the formula (9B), and the formula (10B) simultaneously, even more preferably, the formula (7C), the formula (8C), the formula (9C) and the formula (10C) simultaneously. This can efficiently improve the Q factor of the inductor 1.

The lengths of the above-described L1 to L10 are defined as follows.

The length L1 between the first facing portion 55 and the first wire 21 is the shortest distance L1 between the first top portion 91 and the first wire 21.

The length L2 between the second facing portion 56 and the second wire 22 is the shortest distance between the second top portion 92 and the second wire 22.

The depth L3 of the first concave portion 57 is the largest thickness-direction length L3 from a segment between the first top portion 91 and the second top portion 92 to the first bottom portion 38 of the first concave portion 57.

The length L4 between the fifth facing portion 75 and the first wire 21 is the shortest distance L4 between the third top portion 93 and the first w % ire 21.

The length L5 between the sixth facing portion 76 and the second wire 22 is the shortest distance L5 between the fourth top portion 94 and the second wire 22.

The depth L6 of the third concave portion 77 is the largest thickness-direction length L6 from a segment between the third top portion 93 and the fourth top portion 94 to the second bottom portion 44 of the third concave portion 77.

The depth L7 of the second concave portion 60 is the largest thickness-direction length L7 from a segment between the fifth top portion 86 and the sixth top portion 87 to the third bottom portion 63 of the second concave portion 60.

The depth L8 of the fourth concave portion 80 is the largest thickness-direction length L8 from a segment between the seventh top portion 88 and the eighth top portion 89 to the fourth bottom portion 64 of the fourth concave portion 80.

The lower limit of the Q factor of the inductor 1 is, for example, 30, preferably, 35, more preferably, 40. When the Q factor is the above-described lower limit or more, the resistance component as a loss is reduced, and thus the inductance is increased. On the other hand, the upper limit of the Q factor of the inductor 1 is not especially limited and a high Q factor is preferred.

Next, an exemplary method of producing the inductor 1 is described.

The production method of the inductor 1 includes a first step of preparing the heat press machine 2 (see FIG. 3), and a second step of heat pressing a magnetic sheet 8 (described below) and the first wire 21 and the second wire 22 using the heat press machine 2 (see FIG. 7).

[First Step]

Figure 3:
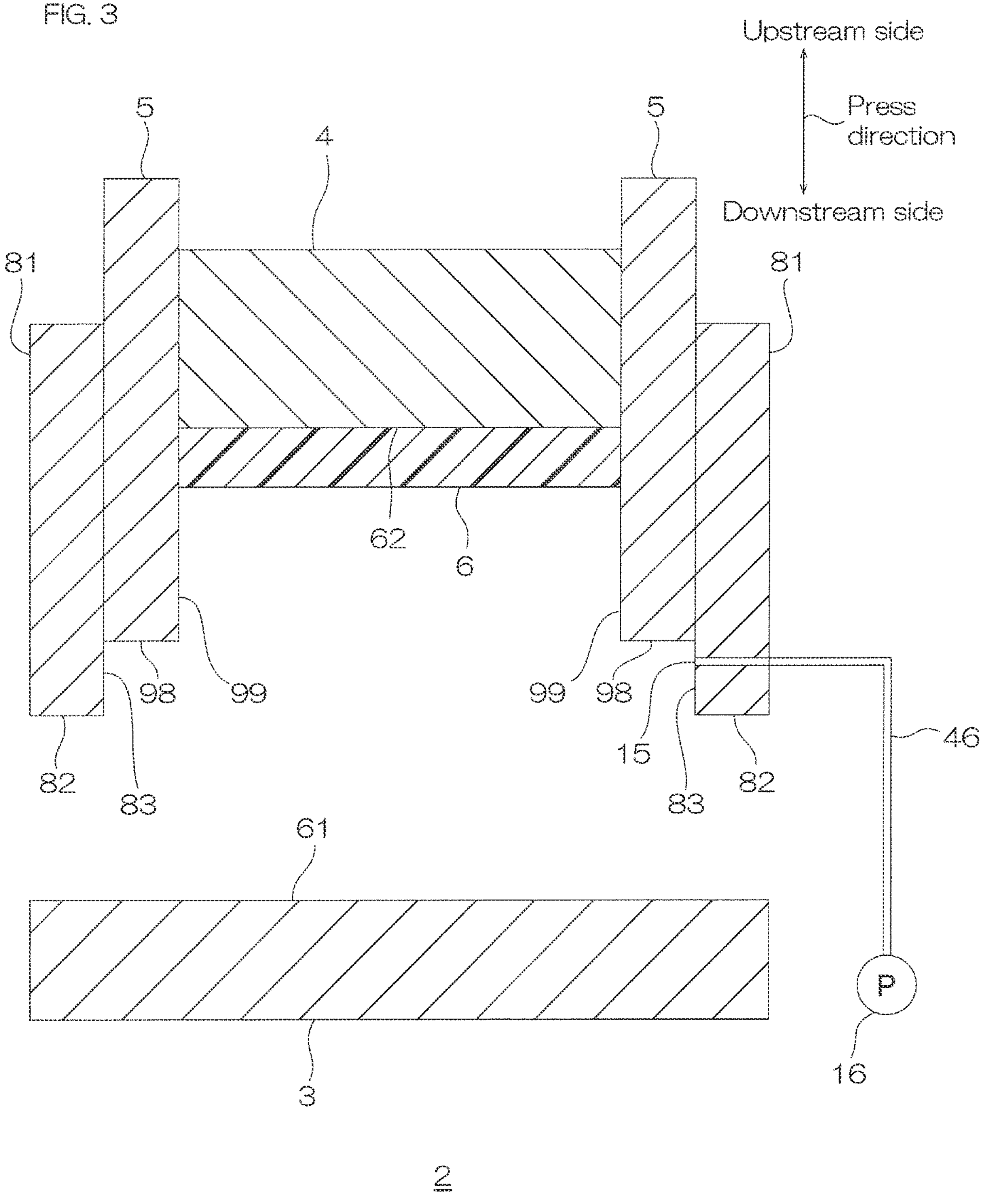
FIG. 3 illustrates the first step preparing a heat press machine in a method of producing the inductor.

As illustrated in FIG. 3, the heat press machine 2 is prepared in the first step.

The heat press machine 2 is an isotropic-pressure press machine capable of isotropically heat pressing (isotropic-pressure press of) the magnetic sheet 8 and the first wire 21 and the second wire 22 (see FIG. 4). The heat press machine 2 includes a first mold 3, a second mold 4, an internal frame member 5, an external frame member 81, and a fluidity and flexibility sheet 6.

In the embodiment, the heat press machine 2 has a structure capable of carrying out a press (tightly contact) by moving the second mold 4, the internal frame member 5, and the external frame member 81 close to the first mold 3. The first mold 3 does not move in a press direction of the heat press machine 2.

The first mold 3 has an approximate board (plate) shape. The first mold 3 has a first press surface 61 facing the second mold 4 described next. The first press surface 61 extends in a direction (a surface direction) orthogonal to the press direction. The first press surface 61 is flat. The first mold 3 includes a heater not illustrated.

The second mold 4 is separated from the first mold 3 by an interval therebetween in the press direction in the first step. The second mold 4 can move with respect to the first mold 3 in the press direction. The second mold 4 has an approximate board (plate) shape smaller than the first mold 3. Specifically, the second mold 4 is included in the first mold 3 when being projected in the press direction. In detail, the second mold 4 overlaps a central part in the surface direction of the first mold 3 when being projected in the press direction. The second mold 4 has a second press surface 62 facing a central part in the surface direction of the first press surface 61 of the first mold 3. The second press surface 62 extends in the surface direction. The second press surface 62 is parallel to the first press surface 61. The second mold 4 includes a heater not illustrated.

The internal frame member 5 surrounds a periphery of the second mold 4. In detail, although not illustrated, the internal frame member 5 surrounds the whole of the periphery of the second mold 4. The internal frame member 5 is separated from the peripheral edge of the first mold 3 by an interval therebetween in the press direction in the first step. In other words, the internal frame member 5 faces the peripheral edge of the first mold 3, holding an interval therebetween in the press direction in the first step. The internal frame member 5 integrally has a third press surface 98 facing a peripheral edge of the first press surface 61 and an internal surface 99 facing inward. The internal frame member 5 can move with respect to both of the first mold 3 and the second mold 4 in the press direction.

A seal member not illustrated is provided between the internal frame member 5 and the second mold 4. The seal member not illustrated prevents the fluidity and flexibility sheet 6 described next from entering between the internal frame member 5 and the second mold 4 during a relative movement of the internal frame member 5 and second mold 4.

The external frame member 81 surrounds a periphery of the internal frame member 5. In detail, although not illustrated, the external frame member 81 surrounds the whole of the periphery of the internal frame member 5. The external frame member 81 is separated from the peripheral edge of the first mold 3 by an interval therebetween in the press direction in the first step. In other words, the external frame member 81 faces the peripheral edge of the first mold 3, holding an interval therebetween in the press direction in the first step. The external frame member 81 integrally has a contact surface 82 facing the peripheral edge of the first press surface 61 and a chamber internal surface 83 facing inward. The external frame member 81 can move with respect to both of the first mold 3 and the internal frame member 5 in the press direction.

The external frame member 81 has an exhaust port 15. The exhaust port 15 has an exhaust-direction upstream end facing an internal end of the chamber internal surface 83. The exhaust port 15 is connected to the vacuum pump 16 through an exhaust line 46. In the first step, the exhaust line 46 is closed.

A seal member not illustrated is provided between the external frame member 81 and the internal frame member 5. The seal member not illustrated prevents a second confined space (described below) 45 from being communicated with the outside during a relative movement of the external frame member 81 and internal frame member 5.

The fluidity and flexibility sheet 6 has an approximate board shape extending in the surface direction orthogonal to the press direction. The fluidity and flexibility sheet 6 is disposed on the second press surface 62 of the second mold 4 The fluidity and flexibility sheet 6 is also disposed on the internal surface 99 of the internal frame member 5. More specifically, the fluidity and flexibility sheet 6 is in contact with the whole of the second press surface 62 and a press-direction downstream side part of the internal surface 99. A seal member not illustrated is provided between the fluidity and flexibility sheet 6 and the internal surface 99 of the internal frame member 5. The internal frame member 5 can move with respect to the fluidity and flexibility sheet 6 in the press direction.

The material of the fluidity and flexibility sheet 6 is not especially limited as long as the material can develop its fluidity and flexibility at the heat press. Examples thereof include gels and soft elastomers. The material of the fluidity and flexibility sheet 6 may be a commercial product. For example, the a GEL series (manufactured by Taica Corporation), or the RIKEN elastomer series (manufactured by RIKEN TECHNOS CORP) may be used. The thickness of the fluidity and flexibility sheet 6 is not especially limited. Specifically, the lower limit of the thickness is, for example, 1 mm, preferably, 2 mm, and the upper limit of the thickness is, for example, 1,000 mm, preferably, 100 mm.

The heat press machine 2 is described in detail, for example, in Japanese Unexamined Patent Publication No. 2004-296746. The heat press machine 2 may be a commercial product.

For example, the dry laminator series manufactured by Nikkiso Co., Ltd. may be used.

[Second Step]

Figure 7:
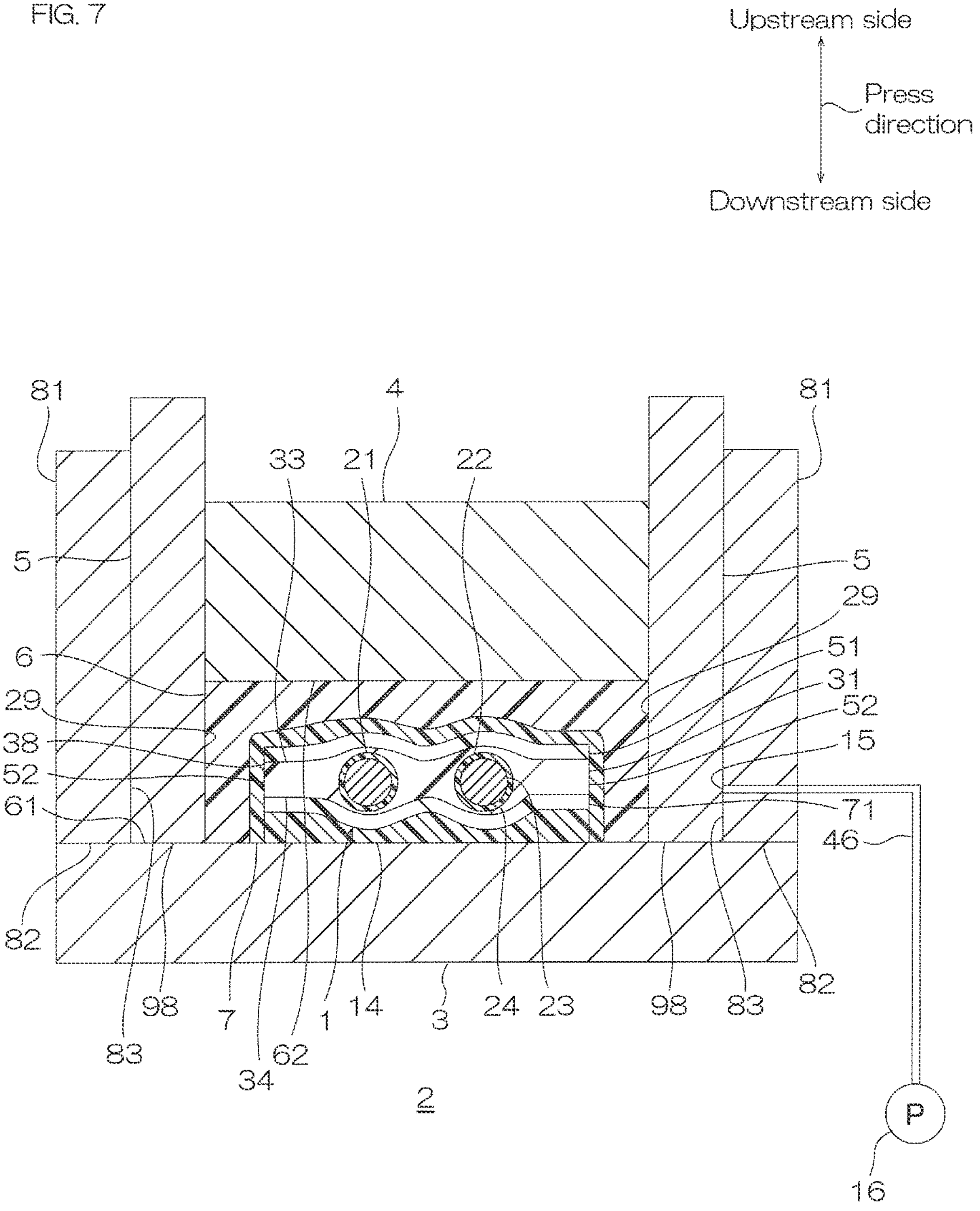
FIG. 7 illustrates the sixth step of heat pressing the magnetic sheet, the first wire, and the second wire inductor in the method of producing the inductor.

In the second step, as illustrated in FIG. 7, the heat press machine 2 heat presses the magnetic sheet 8 and the first wire 21 and the second wire 22. Specifically, the second step includes the third step, the fourth step, the fifth step, and the sixth step. In the second step, the third step, the fourth step, the fifth step, and the sixth step are sequentially carried out.

[Third Step]

As illustrated in FIG. 4, in the third step, a first release sheet 14 is first disposed on the first press surface 61 of the first mold 3.

The first release sheet 14 is smaller than the internal frame member 5 when being projected in the thickness direction.

The first release sheet 14 sequentially includes, for example, a first peeling film 11, a cushion film 12, and a second peeling film 13 toward the downstream side in the press direction. The materials of the first peeling film 11 and second peeling film 13 are appropriately selected depending on the use and purpose. Examples thereof include polyesters such as poluepolyethylene terephthalate (PET), and polyolefins such as polymethylpentene (TPX), and polypropylene. The first peeling film 11 and the second peeling film 13 each have a thickness of, for example, 1 μm or more, and, for example, 1,000 μm or less. The cushion film 12 includes a flexible layer. The flexible layer flows in the surface direction and the thickness direction at the heat press in the second step. Examples of the material of the flexible layer include a thermal flow material that flows in the surface direction and the press direction by the heat press in the second step described below. The thermal flow material includes an olefin-(meth)acrylate copolymer (ethylene-methyl (meth)acrylate copolymer) or an olefin-vinyl acetate copolymer as a main component. The cushion film 12 has a thickness of, for example, 50 μm or more and, for example, 500 μm or less. The cushion film 12 may be a commercial product. For example, the release film OT series (manufactured by SEKISUI CHEMICAL CO., LTD.) may be used.

The first release sheet 14 can include the cushion film 12 and one of the first peeling film 11 and the second peeling film 13, or can include only the cushion film 12.

The first release sheet 14 is disposed on the first mold 3. Thereafter, the magnetic sheet 8 and the first wire 21 and the second wire 22 are set between the first release sheet 14 and the second release sheet 7 so that the magnetic sheet 8 and the first wire 21 and the second wire 22 overlap the fluidity and flexibility sheet 6 when being projected in the press direction.

The magnetic sheet 8 includes three types of magnetic sheets to form the first magnetic layer 31, the second magnetic layer 51, and the third magnetic layer 71. Specifically, the magnetic sheet 8 includes a first sheet 65, a second sheet 66, and a third sheet 67. The first sheet 65 is a magnetic sheet to produce the first magnetic layer 31. The second sheet 66 is a magnetic sheet to produce the second magnetic layer 51. The third sheet 67 is a magnetic sheet to produce the third magnetic layer 71. Each of the first sheet 65, the second sheet 66 and, the third sheet 67 is single or plural. The magnetic sheet 8 consists of the above-described magnetic composition. The thermosetting resin in the magnetic composition making up the magnetic sheet 8 is in B stage.

Specifically, when a plurality of first sheets 65 is used; the third sheet 67, one of the first sheets 65, the first wire 21 and the second wire 22, the other of the first sheets 65, and the second sheet 66 are sequentially laminated in the press direction. At the time, the magnetic sheet 8 can temporarily be fixed to the first wire 21 and the second wire 22 using a plate press having two parallel plates, thereby producing a laminate 48.

Thereafter, the second release sheet 7 is disposed on the laminate 48 (the second sheet 67).

The second release sheet 7 has the same layer structure as that of the first release sheet 14. For example, the first release sheet 14 is smaller than the internal frame member 5 when being projected in the thickness direction.

[Fourth Step]

In the fourth step, as illustrated by the arrows in FIG. 4 and illustrated in FIG. 5, the external frame member 81 is brought into contact with the first mold 3 to form a decompression space 85.

Specifically, the external frame member 81 is pressed to the peripheral edge of the first press surface 61 of the first mold 3. In this manner, the contact surface 82 of the external frame member 81 and the peripheral edge of the first press surface 61 of the first mold 3 are in tight contact (absolute contact) with each other (preferably, pressed).

The decompression space 85 is defined by the chamber internal surface 83 of the external frame member 81, the third press surface 98 and internal surface 99 of the internal frame member 5, the second press surface 62, and the first press surface 61 of the first mold 3. The chamber internal surface 83 defining the decompression space 85 constitutes a chamber device together with the first mold 3.

The pressure of the external frame member 81 on the first mold 3 is set at a degree at which the above-described tight contact of the contact surface 82 and the first press surface 61 can maintain the airtightness of the decompression space 85 described below (allows the decompression space 85 not to be communicated with the outside). Specifically, the pressure is 0.1 MPa or more and 20 MPa or less.

In this manner, a first confined space 84 is formed among the first mold 3, the external frame member 81, and the fluidity and flexibility sheet 6. The first confined space 84 is shielded from the outside. However, the exhaust line 46 is communicated with the first confined space 84.

The second release sheet 7 and the fluidity and flexibility sheet 6 are still separated by an interval therebetween in the press direction.

Subsequently, in the fourth step, the first confined space 84 is depressurized to form the decompression space 85.

Specifically, the vacuum pump 16 is driven and subsequently the exhaust line 46 is opened. This depressurizes the first confined space 84 communicated with the exhaust port 15. In this manner, the first confined space 84 becomes the decompression space 85.

The upper limit of the pressure of the decompression space 85 (or the exhaust line 46) is, for example, 100,000 Pa, preferably, 10,000 Pa. and the lower limit thereof is 1 Pa.

[Fifth Step]

In the fifth step, as illustrated by the arrows in FIG. 5 and as illustrated in FIG. 6, the internal frame member 5 is pressed onto the first mold 3 to form a second confined space 45.

Specifically, the internal frame member 5 is pressed on the peripheral edge of the first press surface 61 of the first mold 3. In this manner, the third press surface 98 of the internal frame member 5 and the peripheral edge of the first press surface 61 of the first mold 3 are brought into tight contact with each other.

The pressure of the internal frame member 5 on the first mold 3 is set at a degree at which the above-described tight contact of the third press surface 98 and the first press surface 61 can prevent the fluidity and flexibility sheet 6 from leaking to the outside in the sixth step described below, and is specifically 0.1 MPa or more and 50 MPa or less.

In this manner, the second confined space 45 surrounded by the first mold 3 and the fluidity and flexibility sheet 6 in the press direction is formed inside the internal frame member 5. The communication between the second confined space 45 and the exhaust line 46 is shut by the internal frame member 5.

The second confined space 45 has the same degree of decompression (atmospheric pressure) as the above-described pressure of the decompression space 85.

The second release sheet 7 is still separated from the fluidity and flexibility sheet 6 by an interval therebetween in the press direction.

[Sixth Step]

As illustrated by the arrows in FIG. 6 and as illustrated in FIG. 7, in the sixth step, the second mold 4 is moved close to the first mold 3 to heat press the magnetic sheet 8 and the first wire 21 and the second wire 22 via the fluidity and flexibility sheet 6, the second release sheet 7, and the first release sheet 14.

A heater included in each of the first mold 3 and the second mold 4 is heated. Subsequently, the second mold 4 is moved in the press direction. By that, the fluidity and flexibility sheet 6 approaches the second release sheet 7, following the movement of the second mold 4.

The fluidity and flexibility sheet 6 flexibly contacts the whole of an upstream side surface in the press direction of the second release sheet 7 excluding the peripheral edge of the second release sheet 7. Meanwhile, the fluidity and flexibility sheet 6 goes along with the shapes of the first wire 21 and the second wire 22 together with the second release sheet 7 because the fluidity and flexibility sheet 6 has fluidity and flexibility. The fluidity and flexibility sheet 6 is in tight contact with the second release sheet 7.

The second mold 4 is further heat pressed toward the first mold 3.

The lower limit of the pressure for the heat press is, for example, 0.1 MPa, preferably, 1 MPa, more preferably, 2 MPa, and the upper limit thereof is, for example, 30 MPa, preferably, 20 MPa, more preferably, 10 MPa. Specifically, the lower limit of the heating temperature is, for example, 100° C., preferably, 110° C., more preferably, 130° C., and the upper limit thereof is, for example, 200° C., preferably, 185° C., more preferably, 175° C. The lower limit of the heating time is, for example, 1 minute, preferably, 5 minutes, more preferably, 10 minutes, and the upper limit thereof is, for example, 1 hour, preferably, 30 minutes.

The magnetic sheet 8 and the first wire 21 and the second wire 22 are pressed at the same pressure from both sides in the thickness direction and the surface direction of the magnetic sheet 8. In short, the magnetic sheet 8 and the first wire 21 and the second wire 22 are pressed at an isotropic pressure.

The magnetic sheet 8 flows so as to embed the first wire 21 and the second wire 22. The magnetic sheet 8 traverses the first wire 21 and the second wire 22 adjacent to each other.

The peripheral side surface 52 of the magnetic sheet 8 is pressed inward from lateral sides (outside) by the fluidity and flexibility sheet 6 and the second release sheet 7. Thus, the outward flow of the peripheral side surface 52 of the magnetic sheet 8 is suppressed.

The above-described flow of the magnetic sheet 8 is caused by the flow of the thermosetting resin in B stage and the flow of the thermoplastic resin blended as necessary based on the heating of the first mold 3 and the second mold 4.

Further heating of the above-described heater brings the thermosetting resin into C stage. In other words, the first magnetic layer 31, the second magnetic layer 51, and the third magnetic layer 71 each containing the magnetic particles and a cured product (C-stage product) of the thermosetting resin are formed.

In this manner, an inductor 1 including the first wire 21 and the second wire 22, the first magnetic layer 31 covering the first wire 21 and the second wire 22 while traversing the adjacent first wire 21 and second wire 22, and the second magnetic layer 51 and third magnetic layer 71 disposed on the first surface 33 and second surface 34 of the first magnetic layer 31, respectively, is produced.

Figure 8:
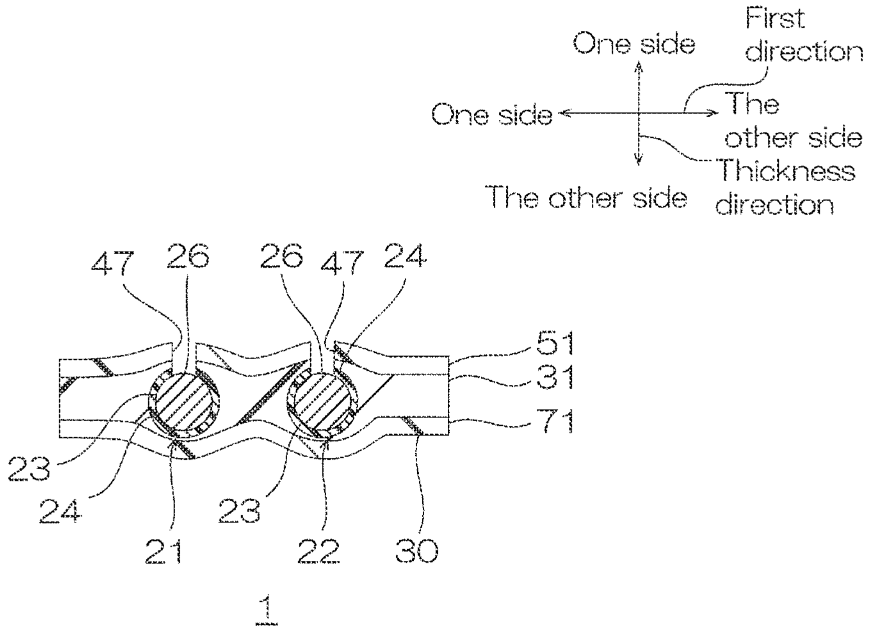
FIG. 8 illustrates a step of forming a through-hole in the inductor taken out of the heat press machine in FIG. 7.

As illustrated in FIG. 8, thereafter, the inductor 1 is taken out of the heat press machine 2. Subsequently, the outer shape of the inductor 1 is processed. For example, a through-hole 47 is formed in the second magnetic layer 51 and the first magnetic layer 31 corresponding to an end in the longitudinal direction of the first wire 21 and the second wire 22. Specifically, the through-hole 47 is formed by removing the corresponding second magnetic layer 51, first magnetic layer 31 and, insulating film 24 by a laser or a hole punch. The through-hole 47 exposes a part of a one-side surface 26 of the conductive wire 23.

Thereafter, for example, a conductive member not illustrated is disposed in the through-hole 47. An external device and the conductive wire 23 are electrically connected to each other through the conductive member, and a conductive connection member such as a solder, a solder paste, or a silver paste. The conductive member includes a plate.

Thereafter, as necessary, the conductive member and conductive connection member are reflowed in a reflow step.

Operations and Effects of Embodiment

The inductor 1 includes the first magnetic layer 31 containing magnetic particles having an approximately spherical shape and the second magnetic layer 51 and third magnetic layer 71 each containing magnetic particles having an approximately flat. Moreover, the relative permeability of each of the second magnetic layer 51 and the third magnetic layer 71 is higher than the relative permeability of the first magnetic layer 31. Thus, the inductor 1 has a high inductance and excellent superimposed DC current characteristics.

Further, the second magnetic layer 51 has the first concave portion 57 and the second concave portion 60. Thus, the approximately flat magnetic particles can efficiently be oriented toward the first concave portion 57 and the second concave portion 60 in the region surrounded by the first concave portion 57 and second concave portion 60 in the second magnetic layer 51. Furthermore, the third magnetic layer 71 has the third concave portion 77 and the fourth concave portion 80. Thus, the approximately flat magnetic particles can efficiently be oriented toward the third concave portion 77 and the fourth concave portion 80 in the region surrounded by the third concave portion 77 and fourth concave portion 80 in the third magnetic layer 71. Hence, an excellent Q factor can be achieved.

Accordingly, the inductor has a high inductance and excellent superimposed DC current characteristics while also having an excellent Q factor.

When L1, L2, and L3 satisfy the formula (1) and the formula (2), the depth L3 of the first concave portion 57 can be large enough with respect to the length L1 between the first facing portion 55 and the first wire 21 and the length L2 between the second facing portion 56 and the second wire 22. Thus, as illustrated in FIG. 2, the approximately flat magnetic particles in proximity to the first concave portion 57 of the second magnetic layer 51 can sufficiently be oriented toward the first concave portion 57. As a result, the Q factor of the inductor 1 can be improved.

$$L3/L1 \geq 0.2 \tag{1}$$

$$L3/L2 \geq 0.2 \tag{2}$$

When L4, L5, and L6 satisfy the formula (2) and the formula (3), the depth L6 of the third concave portion 77 can be large enough with respect to the length L4 between the fifth facing portion 75 and the first wire 21 and the length L5 between the sixth facing portion 76 and the second wire 22. Thus, the approximately flat magnetic particles in proximity to the third concave portion 77 of the third magnetic layer 71 can sufficiently be oriented to the third concave portion 77. As a result, the Q factor of the inductor 1 can be improved.

$$L6/L4 \geq 0.2 \tag{3}$$

$$L6/L5 \geq 0.2 \tag{4}$$

When L3 and L7 satisfy the formula (5), the depth L7 of the second concave portion 60 can be large enough with respect to the depth L3 of the first concave portion 57. Thus, as illustrated in FIG. 2, the approximately flat magnetic particles between the first concave portion 57 and the second concave portion 60 can sufficiently be oriented along the first concave portion 57 and the deeply hollow second concave portion 60. As a result, the Q factor of the inductor 1 can be improved.

$$L7/L32 \geq 0.3 \tag{5}$$

When L6 and L8 satisfy the formula (6), the depth L8 of the fourth concave portion 80 can be large enough with respect to the depth L6 of the third concave portion 77. Thus, as illustrated in FIG. 2, the approximately flat magnetic particles between the third concave portion 77 and the fourth concave portion 80 can sufficiently be oriented along the third concave portion 77 and the deeply hollow fourth concave portion 80. As a result, the Q factor of the inductor 1 can be improved.

$$L8/L6 \geq 0.3 \tag{6}$$

When L1 and L9 satisfy the formula (7), the length L1 between the first facing portion 55 and the first wire 21 can be large enough with respect to the thickness-direction length L9 of the first wire 21. Thus, the inductor 1 can maintain a high inductance while the Q factor of the inductor 1 can be improved.

$$L1/L9 \geq 0.1 \tag{7}$$

When L2 and L10 satisfy the formula (8), the length L2 between the second facing portion 56 and the second wire 22 can be large enough with respect to the thickness-direction length L10 of the second wire 22. Thus, the inductor 1 can maintain a high inductance while the Q factor of the inductor 1 can be improved.

$$L2/L10 \geq 0.1 \tag{8}$$

When L4 and L9 satisfy the formula (9), the length L4 between the third facing portion 58 and the first wire 21 can be large enough with respect to the length L9 of the first wire 21. Thus, the inductor 1 can maintain a high inductance while the Q factor of the inductor 1 can be improved.

$$L4/L9 \geq 0.1 \tag{9}$$

When L5 and L10 satisfy the above-described the formula, the length L5 between the fourth facing portion 59 and the second wire 22 can be large enough with respect to the length L10 of the second wire 22. Thus, the inductor 1 can maintain a high inductance while the Q factor of the inductor 1 can be improved.

$$L5/L10 \geq 0.1 \tag{10}$$

Variations of Embodiment

In the following variations, the same members and steps as in the embodiment will be given the same numerical references and the detailed description will be omitted. Further, the variations can have the same operations and effects as those of the embodiment unless especially described otherwise. Furthermore, the embodiment and variations can appropriately be combined.

In the embodiment, the plurality of magnetic sheets 8 is collectively heat pressed. Although not illustrated, for example, the first sheet 65, the second sheet 66, and the third sheet 67 can sequentially be heat pressed.

The inductor 1 is produced using the heat press machine 2 illustrated in FIG. 3. However, the machine for the production is not especially limited as long as the second concave portion 60 is formed on the second magnetic layer 51, and the fourth concave portion 80 is formed on the third magnetic layer 71.

However, a plate press is not suitable for the embodiment because the plate press cannot form the above-described second concave portion 60 and fourth concave portion 80 and flattens each of the fourth surface 54 and the sixth surface 74.

Figure 9:
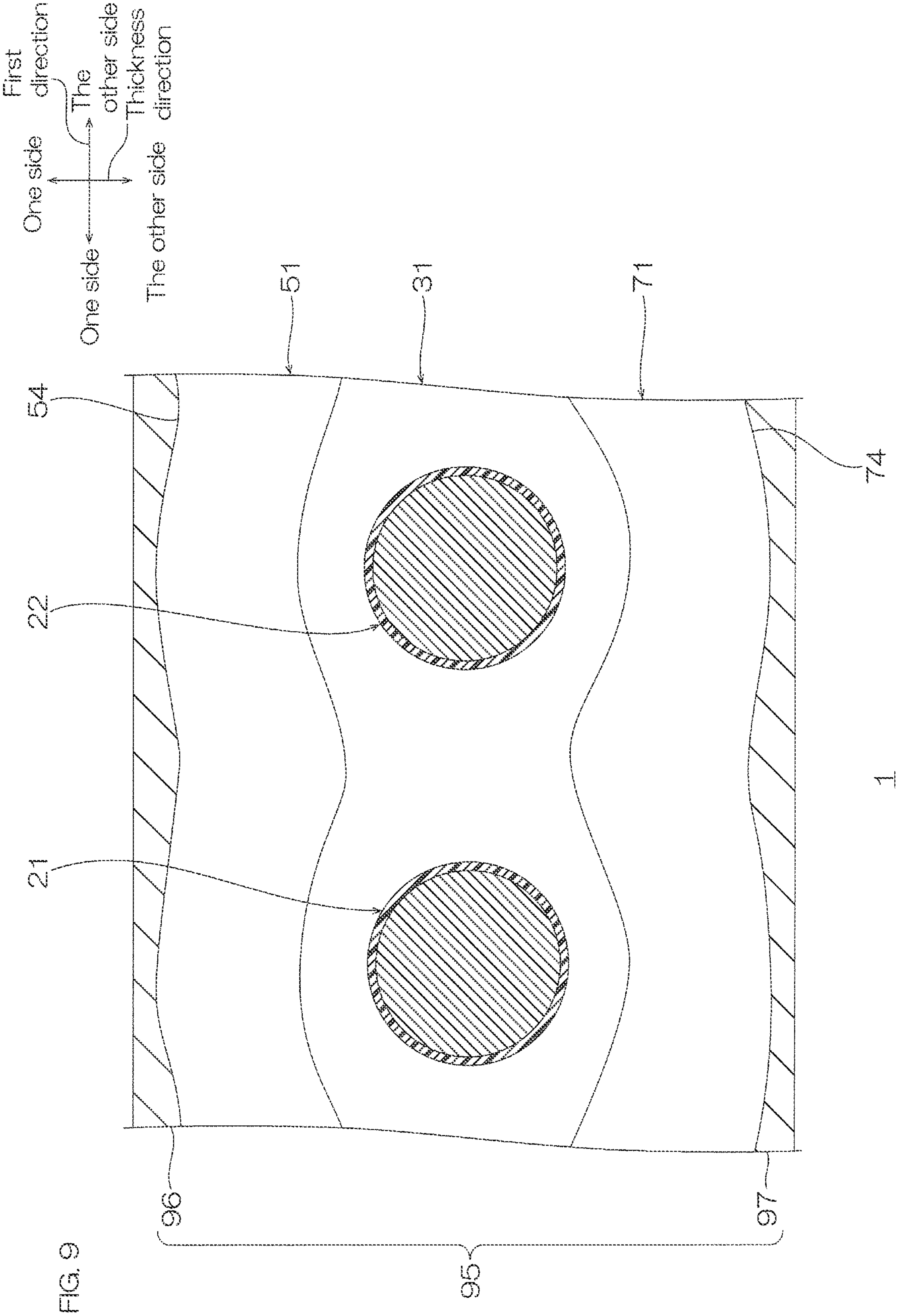
FIG. 9 is a cross-sectional view of a variation of the inductor in FIG. 1 (a mode in which the inductor further includes a functional layer).

As illustrated in FIG. 9, the inductor 1 can further include a functional layer 95 that does not contain magnetic particles. The functional layer 95 includes a first functional layer 96 disposed on the fourth surface 54 of the second magnetic layer 51, and a second functional layer 97 disposed on the sixth surface 74 of the third magnetic layer 71. Both of the first functional layer 96 and the second functional layer 97 are, for example, resin layers each consisting only of resin.

Both of the one surface in the thickness direction of the first functional layer 96 and the other surface in the thickness direction of the second functional layer 97 are flat. The one surface in the thickness direction of the first functional layer 96 and/or the other surface in the thickness direction of the second functional layer 97 are/is provided, for example, as a pickup surface of an absorption (suction) pickup device.

The functional layer 95 may be a barrier layer that suppresses water and/or oxygen permeation. In this manner, the barrier layer can suppress corrosion of the second magnetic layer 51 and third magnetic layer 71.

Although not illustrated, each of the first wire 21 and the second wire 22 can have, for example, an approximately polygonal shape in the cross-sectional view such as an approximately rectangular shape in the cross-sectional view.

EXAMPLES

The present invention will be more specifically described below with reference to Preparation Examples, Examples, and Comparative Examples. The present invention is not limited to Preparation Examples, Examples, and Comparative Examples in any way. The specific numeral values used in the description below, such as mixing ratios (contents), physical property values, and parameters can be replaced with corresponding mixing ratios (contents), physical property values, parameters in the above-described "DESCRIPTION OF EMBODIMENTS", including the upper limit value (numeral values defined with "or less", and "less than") or the lower limit value (numeral values defined with "or more", and "more than").

Preparation Example 1

(Preparation of Binder) 24.5 parts by mass of an epoxy resin (main agent), 24.5 parts by mass of phenol resin (curing agent), 1 parts by mass of an imidazole compound (curing accelerator), and 50 parts by mass of an acrylic resin (thermoplastic resin) were mixed, thereby preparing a binder.

Example 1

As illustrated in FIG. 3, a dry laminator (manufactured by Nikkiso Co., Ltd.) was prepared as the above-described heat press machine 2 (to carry out the first step).

Magnetic particles and the binder of Preparation Example 1 were blended in the volume ratio shown in Table 1 and mixed to produce a first sheet 65, a second sheet 66, and a third sheet 67 (magnetic sheet 8) so that the first sheet 65 and the second sheet 66, and the third sheet 67 would contain magnetic particles in accordance with the types and volume ratios shown in Table 1, respectively.

The first wire 21 with L9 of 260 μm and the second wire 22 with L10 of 260 μm were held between the above-described magnetic sheets 8 to produce a laminate 48 by a plate press. The distance L0 between the first wire 21 and the second wire 22 was 240 μm. The plate press was carried out under condition of a temperature of 110° C., a period of time of 1 minute, and a pressure of 0.9 MPa (a gauge pressure of 2 kN).

Thereafter, as illustrated in FIG. 5, the external frame member 81 was brought into tight contact with the first mold 3, thereby forming the first confined space 84. Subsequently, the vacuum pump 16 is driven to decompress a first confined space 84, thereby forming a decompression space 85 (the fourth step). The atmospheric pressure of the decompression space 85 was 2666 Pa (20 torr).

Thereafter, as illustrated in FIG. 6, the internal frame member 5 was pressed to the first mold 3, thereby forming a second confined space 45 at 2666 Pa smaller the decompression space 85 in size (the fifth step).

Thereafter, as illustrated in FIG. 7, the second mold 4 was moved close to the first mold 3 to heat press the magnetic sheet 8 and the first wire 21 and the second wire 22 through the fluidity and flexibility sheet 6, the second release sheet 7, and the first release sheet 14 (the sixth step). The heat press was carried out at a temperature of 170° C. for a period of time of 15 minutes. The heat press was carried out at the pressure shown in Table 1.

In this manner, an inductor 1 including the first wire 21 and the second wire 22, the precursor magnetic layer 31, the second magnetic layer 51, and the third magnetic layer 71 was produced.

Example 2

Except that the thickness of each of the first sheet 65, the second sheet 66, and the third sheet 67 was changed as shown in Table 2, the same process as Example 1 was carried out to produce an inductor 1.

Comparative Example 1

Except that a plate press machine was used instead of the heat press machine 2 illustrated in FIG. 3 to FIG. 7 to heat press the first sheet 65, the second sheet 66 and the third sheet 67 as shown in Table 3, the same process as Example 1 was carried out to produce an inductor 1.

Evaluation (Cross-Section Observation and Dimensions)

The cross-sectional dimensions of each member of the inductor 1 of each Example were obtained by SEM cross-section observation. The results are shown in Table 4.

In addition, the shapes of the second magnetic layer 51 and the third magnetic layer 71 were observed. In Examples 1 and 2, the second magnetic layer 51 had the second concave portion 60, and the third magnetic layer 71 had the fourth concave portion 80.

The shape of the inductor 1 of Comparative Example 1 was observed. In the inductor 1 of Comparative Example 1, the second magnetic layer 51 did not include the second concave portion 60, and the fourth surface 54 was flat. In the inductor 1 of Comparative Example 1, the third magnetic layer 71 did not include the fourth concave portion 80, and the sixth surface 74 was flat.

<Inductance>

The inductance of the first wire 21 and the second wire 22 of the inductor 1 of each of Examples and Comparative Example was measured. In conformity to the following criterion, the inductance at a frequency of 10 MHz was evaluated.

The measurement was carried out using an impedance analyzer ("4291B" manufactured by Agilent Technologies, Inc.).

[Criterion]

Good: The inductance was 250 nH or more.

<Superimposed DC Current Characteristics>

The rate of decrease in inductance of the inductor 1 at a frequency of 10 MHz was measured in each of Examples and Comparative Example to evaluate its superimposed DC current characteristics. The measurement of the inductance decrease rate was carried out using an impedance analyzer ("65120B" manufactured by Kuwaki Electronics Co., Ltd.). In conformity to the following criterion, the inductance decrease rate was evaluated. [inductance in a state in which a DC bias current was not applied-inductance in a state in which a DC bias current of 10 A was applied]/[inductance in a state in which a DC bias current of 10 A was applied]×100(%)

[Criterion]

Good: The inductance decrease rate relative to Comparative Example 1 was 30% or less.

<Q Factor>

The Q factor of the inductor 1 was measured in each of Examples and Comparative Example. In conformity to the following criteria, the Q factor was evaluated. The measurement was carried out using an impedance analyzer ("4291B" manufactured by Agilent Technologies, Inc.).

[Criteria]

Good: The Q factor was 30 or more.

Bad: The Q factor was less than 30.

TABLE 1

| Example 1 | | Thickness (μm) | Magnetic particles | % by volume | Relative permeability | Press | Magnetic layer of inductor |
|---|---|---|---|---|---|---|---|
| Magnetic sheet | First sheet | 55 | Carbonyl iron powders*[1] | 60 | 10 | (Collective) | First magnetic layer |
| located nearer to one | First sheet | 55 | Carbonyl iron powders*[1] | 60 | 10 | isotropic | (C stage) |
| side in thickness | Second sheet | 55 | Fe—Si alloy*[2] | 45 | 43 | pressure | Second magnetic layer |
| direction than first | Second sheet | 55 | Fe—Si alloy*[2] | 45 | 43 | press*[3] | (C stage) |
| wire and second wire | Second sheet | 85 | Fe—Si alloy*[2] | 55 | 54 | | |
| (B stage) | Second sheet | 85 | Fe—Si alloy*[2] | 55 | 54 | | |
| | Second sheet | 85 | Fe—Si alloy*[2] | 55 | 54 | | |
| | Second sheet | 85 | Fe—Si alloy*[2] | 55 | 54 | | |
| Magnetic sheet | First sheet | 55 | Carbonyl iron powders*[1] | 60 | 10 | | First magnetic layer |
| located nearer to the | First sheet | 55 | Carbonyl iron powders*[1] | 60 | 10 | | (C stage) |
| other side in | Third sheet | 55 | Fe—Si alloy*[2] | 45 | 43 | | Third magnetic layer |
| thickness direction | Third sheet | 55 | Fe—Si alloy*[2] | 45 | 43 | | (C stage) |
| than first wire and | Third sheet | 85 | Fe—Si alloy*[2] | 55 | 54 | | |
| second wire | Third sheet | 85 | Fe—Si alloy*[2] | 55 | 54 | | |
| (B stage) | Third sheet | 85 | Fe—Si alloy*[2] | 55 | 54 | | |
| | Third sheet | 85 | Fe—Si alloy*[2] | 55 | 54 | | |

*[1]Median particle size of 4.1 μm
*[2]Median particle size of 40 μm
*[3]2.7 MPa

TABLE 2

| Example 2 | | Thickness (μm) | Magnetic particles | % by volume | Relative permeability | Press | Magnetic layer of inductor |
|---|---|---|---|---|---|---|---|
| Magnetic sheet | First sheet | 55 | Carbonyl iron powders*[1] | 60 | 10 | (Collective) | First magnetic layer |
| located nearer to one | First sheet | 55 | Carbonyl iron powders*[1] | 60 | 10 | isotropic | (C stage) |
| side in thickness | First sheet | 55 | Carbonyl iron powders*[1] | 60 | 10 | pressure | |
| direction than first | Second sheet | 55 | Fe—Si alloy*[2] | 45 | 43 | press*[3] | Second magnetic layer |
| wire and second wire | Second sheet | 55 | Fe—Si alloy*[2] | 45 | 43 | | (C stage) |
| (B stage) | Second sheet | 55 | Fe—Si alloy*[2] | 55 | 54 | | |
| | Second sheet | 55 | Fe—Si alloy*[2] | 55 | 54 | | |
| | Second sheet | 55 | Fe—Si alloy*[2] | 55 | 54 | | |
| | Second sheet | 55 | Fe—Si alloy*[2] | 55 | 54 | | |
| Magnetic sheet | First sheet | 55 | Carbonyl iron powders*[1] | 60 | 10 | | First magnetic layer |
| located nearer to the | First sheet | 55 | Carbonyl iron powders*[1] | 60 | 10 | | (C stage) |
| other side in | First sheet | 55 | Carbonyl iron powders*[1] | 60 | 10 | | |
| thickness direction | Third sheet | 55 | Fe—Si alloy*[2] | 45 | 43 | | Third magnetic layer |
| than first wire and | Third sheet | 55 | Fe—Si alloy*[2] | 45 | 43 | | (C stage) |
| second wire | Third sheet | 55 | Fe—Si alloy*[2] | 55 | 54 | | |
| (B stage) | Third sheet | 55 | Fe—Si alloy*[2] | 55 | 54 | | |
| | Third sheet | 55 | Fe—Si alloy*[2] | 55 | 54 | | |
| | Third sheet | 55 | Fe—Si alloy*[2] | 55 | 54 | | |

*[1]Median particle size of 4.1 μm
*[2]Median particle size of 40 μm
*[3]2.7 MPa

TABLE 3

| Comparative Example 1 | | Thickness (μm) | Magnetic particles | % by volume | Relative permeability | Press | Magnetic layer of inductor |
|---|---|---|---|---|---|---|---|
| Magnetic sheet | First sheet | 55 | Carbonyl iron powders*[1] | 60 | 10 | (Collective) | First magnetic layer |
| located nearer to one | First sheet | 55 | Carbonyl iron powders*[1] | 60 | 10 | plate press*[3] | (C stage) |
| side in thickness | First sheet | 55 | Carbonyl iron powders*[1] | 60 | 10 | | |
| direction than first | Second sheet | 55 | Fe—Si alloy*[2] | 45 | 43 | | Second magnetic layer |

TABLE 3-continued

| Comparative Example 1 | | Thickness (μm) | Magnetic particles | % by volume | Relative permeability | Press | Magnetic layer of inductor |
|---|---|---|---|---|---|---|---|
| wire and second wire | Second sheet | 55 | Fe—Si alloy*2 | 45 | 43 | | (C stage) |
| (B stage) | Second sheet | 85 | Fe—Si alloy*2 | 55 | 54 | | |
| | Second sheet | 85 | Fe—Si alloy*2 | 55 | 54 | | |
| | Second sheet | 85 | Fe—Si alloy*2 | 55 | 54 | | |
| | Second sheet | 85 | Fe—Si alloy*2 | 55 | 54 | | |
| Magnetic sheet | First sheet | 55 | Carbonyl iron powders*1 | 60 | 10 | | First magnetic layer |
| located nearer to the | First sheet | 55 | Carbonyl iron powders*1 | 60 | 10 | | (C stage) |
| other side in | First sheet | 55 | Carbonyl iron powders*1 | 60 | 10 | | |
| thickness direction | Third sheet | 55 | Fe—Si alloy*2 | 45 | 43 | | Third magnetic layer |
| than first wire and | Third sheet | 55 | Fe—Si alloy*2 | 45 | 43 | | (C stage) |
| second wire | Third sheet | 85 | Fe—Si alloy*2 | 55 | 54 | | |
| (B stage) | Third sheet | 85 | Fe—Si alloy*2 | 55 | 54 | | |
| | Third sheet | 85 | Fe—Si alloy*2 | 55 | 54 | | |
| | Third sheet | 85 | Fe—Si alloy*2 | 55 | 54 | | |

*1Median particle size of 4.1 μm

*2Median particle size of 40 μm

*32.7 MPa

TABLE 4

| Dimensions/Evaluation | L1 μm | L2 μm | L3 μm | Formula (1) L3/L1 Ratio | Formula (2) L3/L2 Ratio | L7 μm | Formula (5) L7/L3 Ratio | L9 μm | Formula (7) L1/L9 Ratio | Formula (8) L2/L10 Ratio |
|---|---|---|---|---|---|---|---|---|---|---|
| Example 1 | 100 | 100 | 50 | 0.5 | 0.5 | 35 | 0.70 | 260 | 0.4 | 0.4 |
| Example 2 | 130 | 130 | 33 | 0.3 | 0.3 | 25 | 0.76 | 260 | 0.5 | 0.5 |
| Comparative Example 1 | — | — | — | — | — | 0 | — | 260 | — | — |

| Dimensions/Evaluation | L4 μm | L5 μm | L6 μm | Formula (3) L6/L4 Ratio | Formula (4) L6/L5 Ratio | L8 μm | Formula (6) L8/L6 Ratio | L10 μm | Formula (9) L4/L9 Ratio | Formula (10) L5/L10 Ratio |
|---|---|---|---|---|---|---|---|---|---|---|
| Example 1 | 65 | 65 | 40 | 0.6 | 0.6 | 35 | 0.9 | 260 | 0.3 | 0.3 |
| Example 2 | 130 | 130 | 33 | 0.3 | 0.3 | 25 | 0.8 | 260 | 0.5 | 0.5 |
| Comparative Example 1 | — | — | — | — | — | 0 | — | 260 | — | — |

TABLE 5

| Example/ Comparative Example | Inductance L [nH] | Inductance Evaluation | Superimposed DC current characteristics Evaluation | Q factor | Q factor Evaluation |
|---|---|---|---|---|---|
| Example 1 | 269 | Good | Good | 46 | Good |
| Example 2 | 265 | Good | Good | 49 | Good |
| Comparative Example 1 | 260 | Good | Good | 23 | Bad |

While the illustrative embodiments of the present invention are provided in the above description, such is for illustrative purpose only and it is not to be construed as limiting in any manner. Modification and variation of the present invention that will be obvious to those skilled in the art is to be covered by the following claims.

INDUSTRIAL APPLICABILITY

The inductor is used for various uses and purposes.

DESCRIPTION OF REFERENCE NUMERALS

1 inductor
21 first wire
22 second wire
31 outer peripheral surface
31 first magnetic layer
32 inner peripheral surface
33 first surface
34 second surface
51 second magnetic layer
53 third surface
54 fourth surface
55 first facing portion
56 second facing portion
57 first concave portion
58 third facing portion
59 fourth facing portion
60 second concave portion
71 third magnetic layer
73 fifth surface
74 sixth surface
75 fifth facing portion
76 sixth facing portion
77 third concave portion
78 seventh facing portion
79 eighth facing portion
80 fourth concave portion
L1 length between the first facing portion and the first wire
L2 length between the second facing portion and the second wire
L3 depth of the first concave portion L4 length between the fifth facing portion and the first wire
L5 length between the sixth facing portion and the second wire
L6 depth of the third concave portion
L7 depth of the second concave portion
L8 depth of the fourth concave portion
L9 length of the first wire
L10 length of the second wire

The invention claimed is:

1. An inductor comprising:
a first wire and a second wire adjacent to each other and separated by an interval;
a first magnetic layer having
a first surface continuing in a surface direction,
a second surface separated from the first surface by an interval in a thickness direction, and continuing in the surface direction, and
an inner peripheral surface located between the first surface and the second surface, being in contact with an outer peripheral surface of the first wire and an outer peripheral surface of the second wire,
the first magnetic layer containing approximately spherical-shaped magnetic particles and resin;
a second magnetic layer having
a third surface being in contact with the first surface, and
a fourth surface separated from the third surface in the thickness direction,
the second magnetic layer containing approximately flat-shaped magnetic particles and the and resin; and
a third magnetic layer having
a fifth surface being in contact with the second surface, and
a sixth surface separated from the fifth surface by an interval in the thickness direction,
the third magnetic layer containing approximately flat-shaped magnetic particles and resin,
wherein each of a relative permeability of the second magnetic layer and a relative permeability of the third magnetic layer is higher than a relative permeability of the first magnetic layer,
the third surface has a first concave portion caving in from a first facing portion facing the first wire in the thickness direction and a second facing portion facing the second wire in the thickness direction between the first facing portion and the second facing portion,
the fourth surface has a second concave portion caving in from a third facing portion facing the first facing portion in the thickness direction and a fourth facing portion facing the second facing portion in the thickness direction between the third facing portion and the fourth facing portion,
the fifth surface has a third concave portion caving in from a fifth facing portion facing the first wire in the thickness direction and a sixth facing portion facing the second wire in the thickness direction between the fifth facing portion and the sixth facing portion, and
the sixth surface has a fourth concave portion caving in from a seventh facing portion facing the fifth facing portion in the thickness direction and an eighth facing portion facing the second facing portion in the thickness direction between the seventh facing portion and the eighth facing portion.

2. The inductor according to claim 1, wherein
a length L1 between the first facing portion and the first wire, a length L2 between the second facing portion and the second wire, and a depth L3 of the first concave portion satisfy formula (1) and formula (2) described below, and
a length L4 between the fifth facing portion and the first wire, a length L5 between the sixth facing portion and the second wire, and a depth L6 of the third concave portion satisfy formula (3) and formula (4) described below:

$$L3/L1 \geq 0.2 \quad (1);$$

$$L3/L2 \geq 0.2 \quad (2);$$

$$L6/L4 \geq 0.2 \quad (3); \text{ and}$$

$$L6/L5 \geq 0.2 \quad (4).$$

3. The inductor according to claim 1, wherein
a depth L3 of the first concave portion and a depth L7 of the second concave portion satisfy formula (5) described below, and
a depth L6 of the third concave portion and a depth L8 of the fourth concave portion satisfy formula (6) described below:

$$L7/L3 \geq 0.3 \quad (5); \text{ and}$$

$$L8/L6 \geq 0.3 \quad (6).$$

4. The inductor according to claim 1, wherein
a length L1 between the first facing portion and the first wire and a thickness-direction length L9 of the first wire satisfy formula (7) described below,
a length L2 between the second facing portion and the second wire and a thickness-direction length L10 of the second wire satisfy formula (8) described below,
a length L4 between the fifth facing portion and the first wire and the length L9 of the first wire satisfy formula (9) described below, and
a length L5 between the sixth facing portion and the second wire and the length L10 of the second wire satisfy formula (10) described below:

$$L1/L9 \geq 0.1 \quad (7);$$

$$L2/L10 \geq 0.1 \quad (8);$$

$$L4/L9 \geq 0.1 \quad (9); \text{ and}$$

$$L5/L10 \geq 0.1 \quad (10).$$

5. The inductor according to claim 2, wherein
the length L1 between the first facing portion and the first wire and a thickness-direction length L9 of the first wire satisfy formula (7) described below,
the length L2 between the second facing portion and the second wire and a thickness-direction length L10 of the second wire satisfy formula (8) described below,
the length L4 between the fifth facing portion and the first wire and the length L9 of the first wire satisfy formula (9) described below, and
the length L5 between the sixth facing portion and the second wire and the thickness-direction length L10 of the second wire satisfy formula (10) described below:

$$L1/L9 \geq 0.1 \quad (7);$$

$$L2/L10 \geq 0.1 \quad (8);$$

$$L4/L9 \geq 0.1 \quad (9); \text{ and}$$

$$L5/L10 \geq 0.1 \quad (10).$$

6. The inductor according to claim 3, wherein a length L1 between the first facing portion and the first wire and a thickness-direction length L9 of the first wire satisfy formula (7) described below, a length L2 between the second facing portion and the second wire and a thickness-direction length L10 of the second wire satisfy formula (8) described below, a length L4 between the fifth facing portion and the first wire and the thickness-direction length L9 of the first wire satisfy formula (9) described below, and a length L5 between the sixth facing portion and the second wire and the thickness-direction length L10 of the second wire satisfy formula (10) described below:

$$L1/L9 \geq 0.1 \quad (7);$$

$$L2/L10 \geq 0.1 \quad (8);$$

$$L4/L9 \geq 0.1 \quad (9);\ \text{and}$$

$$L5/L10 \geq 0.1 \quad (10).$$

* * * * *